United States Patent [19]

Bridges, Jr. et al.

[11] 4,141,078
[45] Feb. 20, 1979

[54] LIBRARY CIRCULATION CONTROL SYSTEM

[75] Inventors: Louis E. Bridges, Jr., Mesquite; Terry L. Parsons, Plano, both of Tex.

[73] Assignee: Innovated Systems, Inc., Dallas, Tex.

[21] Appl. No.: 622,217

[22] Filed: Oct. 14, 1975

[51] Int. Cl.² ................ G08B 13/24; G06F 15/24
[52] U.S. Cl. .................... 364/900; 235/380; 235/385; 364/419; 364/403; 340/572
[58] Field of Search ........... 340/172.5, 149 A, 149 R, 340/280; 445/1; 444/1; 235/61.7 B, 61.7 R, 380, 385; 364/900 MS File, 403, 419, 300; 283/55

[56] References Cited

U.S. PATENT DOCUMENTS

| | | | |
|---|---|---|---|
| 3,637,989 | 1/1972 | Howard et al. | 235/61.7 R |
| 3,665,164 | 5/1972 | Beveridge et al. | 235/61.11 E |
| 3,741,345 | 6/1973 | Saridis | 186/1 R |
| 3,852,571 | 12/1974 | Hall et al. | 235/61.7 B |
| 3,916,386 | 10/1975 | Teixeira et al. | 340/172.5 |
| 3,937,925 | 2/1976 | Boothroyd | 235/61.7 B |

OTHER PUBLICATIONS

"Report on a Library Automation Project Conducted at the University of Illinois" by Robert Kozlow, Chapt. 3,4 plus appendices, 1965.
Robert Hayes et al., Handbook of Data Processing for Libraries, 1970, pp. 481–509, 313, 316–323.
Veneziano, "An Interactive Computer Based Circulation . . . Work", U. Lib. Automation 1972, pp. 101–117, see p. 105.
Aagaard, "An Interactive in Development", 1972, U. Lib. Automation, pp. 3–9.
Buckland, "Circulation Control . . . Hybrid", 1972, U. Lib. Automation, pp. 30–37, see p. 36.

Primary Examiner—Mark E. Nusbaum
Attorney, Agent, or Firm—Hubbard, Thurman, Turner, Tucker & Glaser

[57] ABSTRACT

An automated library circulation control system includes a plurality of remote book processing terminals and a computer controlling the terminals and processing data between the terminals and the computer to maintain a current inventory of the circulation status of the library books. The system provides for automatic charging of library materials by patrons, record keeping of all library transactions, modification and interrogation of computer data files, intercommunication between the computer and a remote data processor and detection of unauthorized removal of books from the library. Each terminal has a card reader for patron identification, an optical reader for book identification, an electromagnetic activator for magnetizing and demagnetizing a magnetic strip in each book, a printer for printing charge-out information, and a display screen and keyboard for communications between patron and computer. In charging a book, a patron inserts his card in the card reader and places the book in a book tray in the terminal. The optical scanner reads bar coded symbols on a label on the front of the book. The computer compares the card reader and optical scanner inputs with its data files to determine that the patron is authorized to charge out books and that the book is authorized to be checked out. If authorization is given, the transaction is recorded by the computer which then enables the printer to provide a print-out of the transaction for the patron.

30 Claims, 24 Drawing Figures

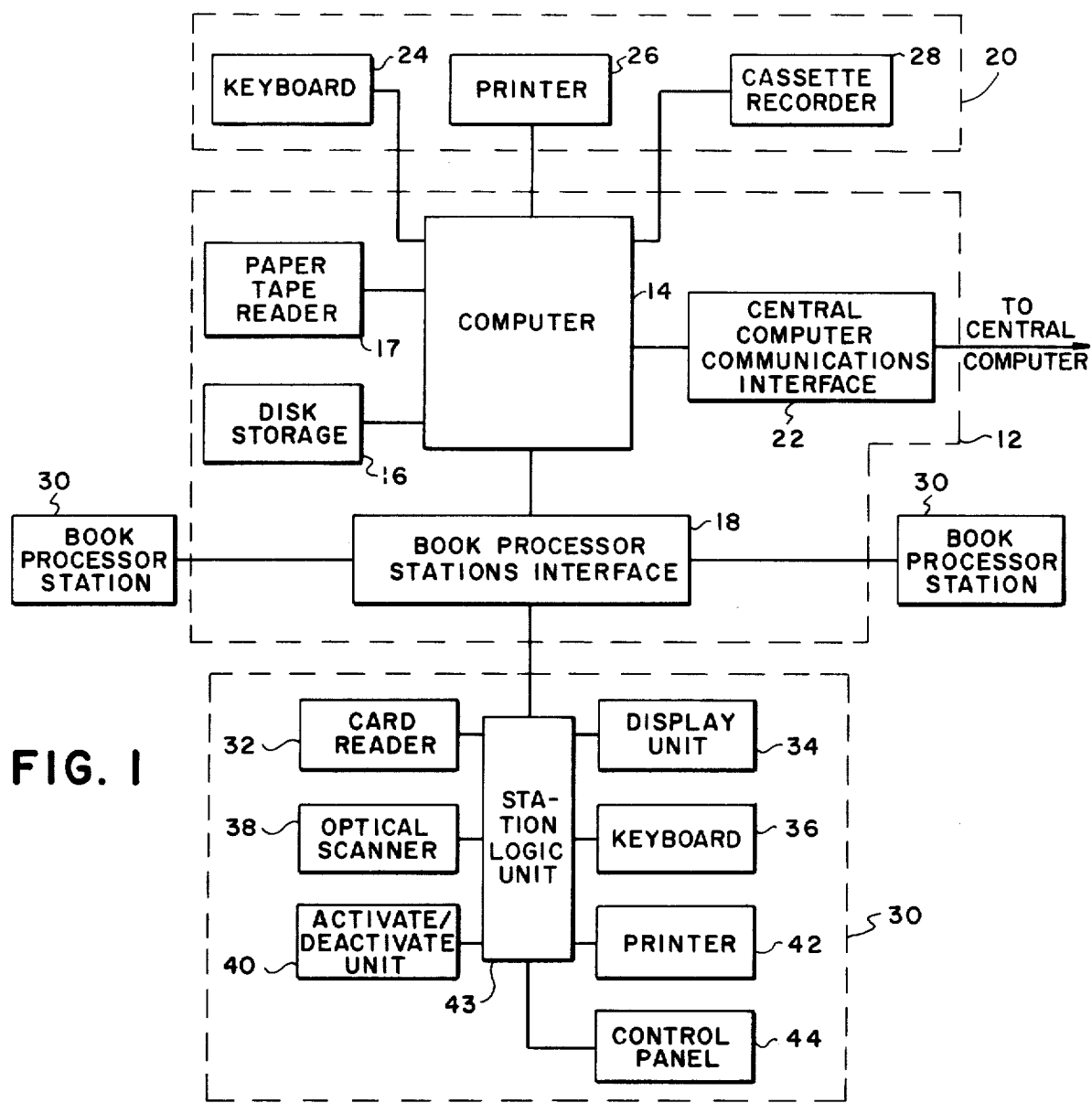
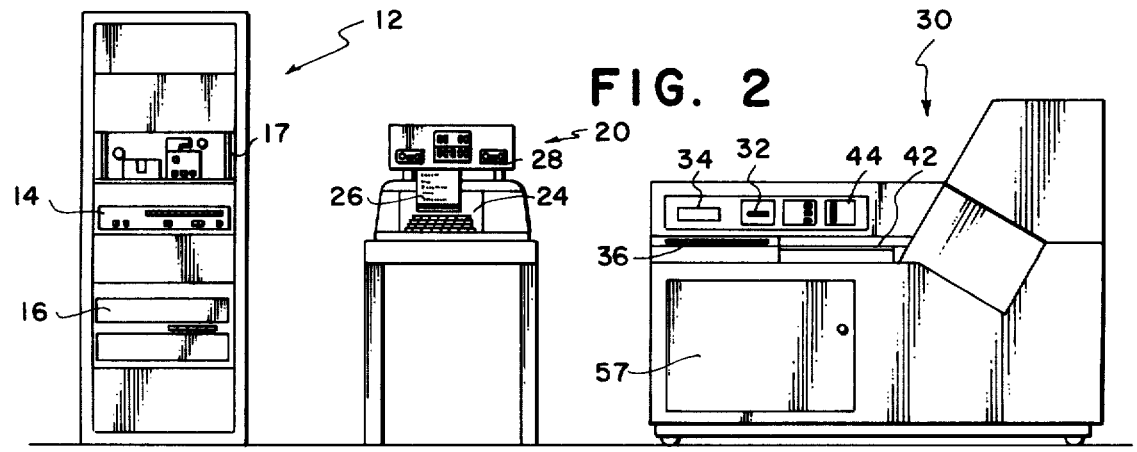

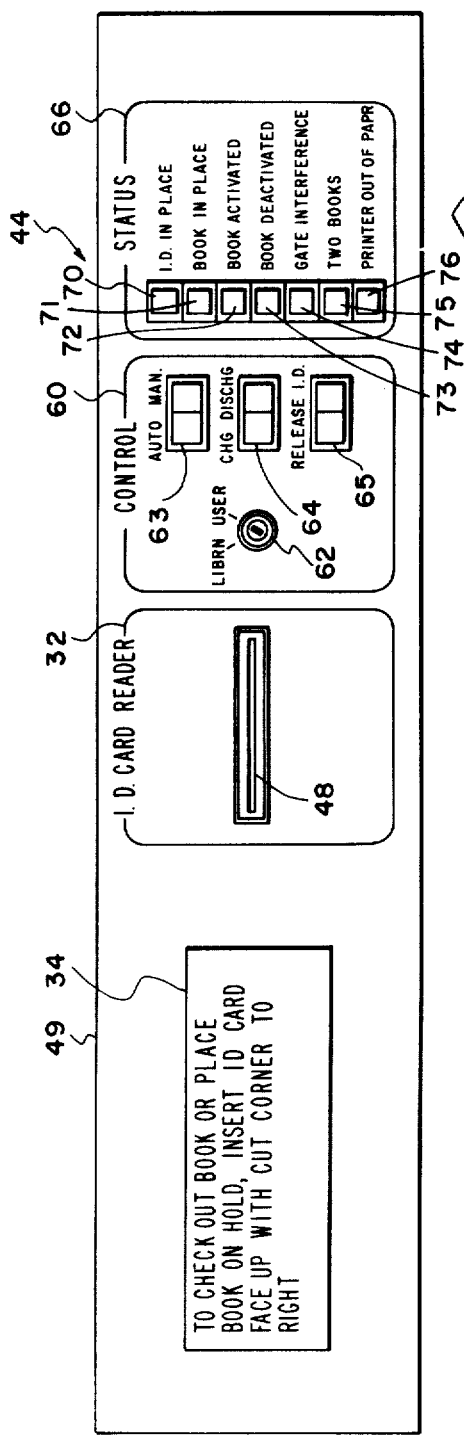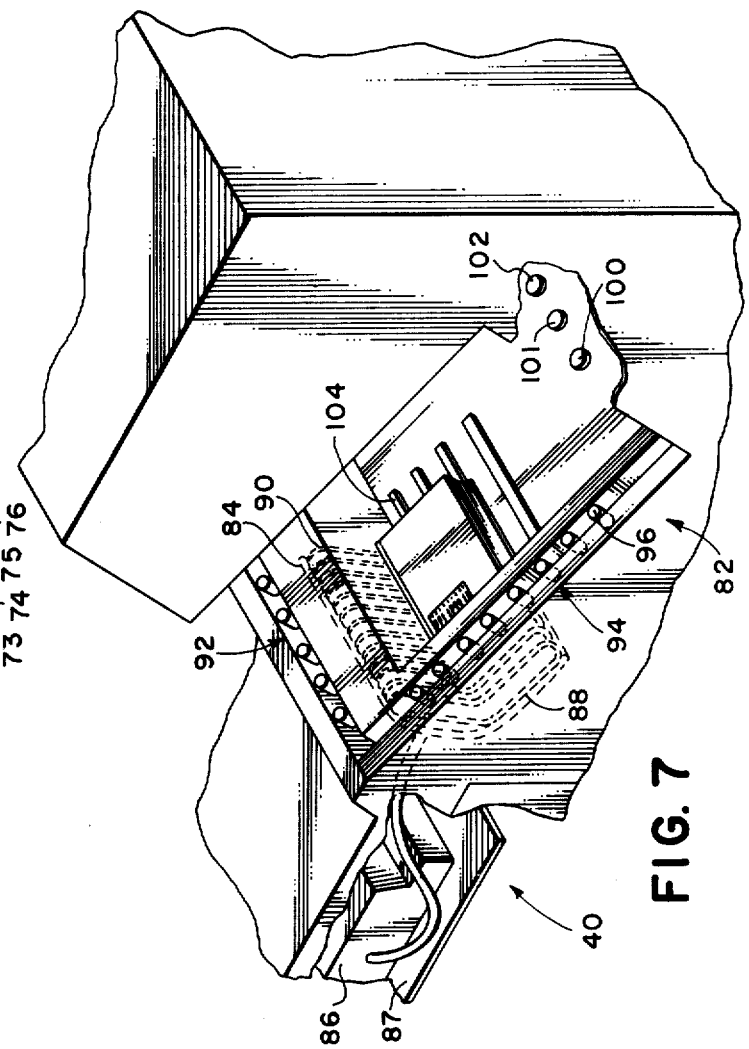

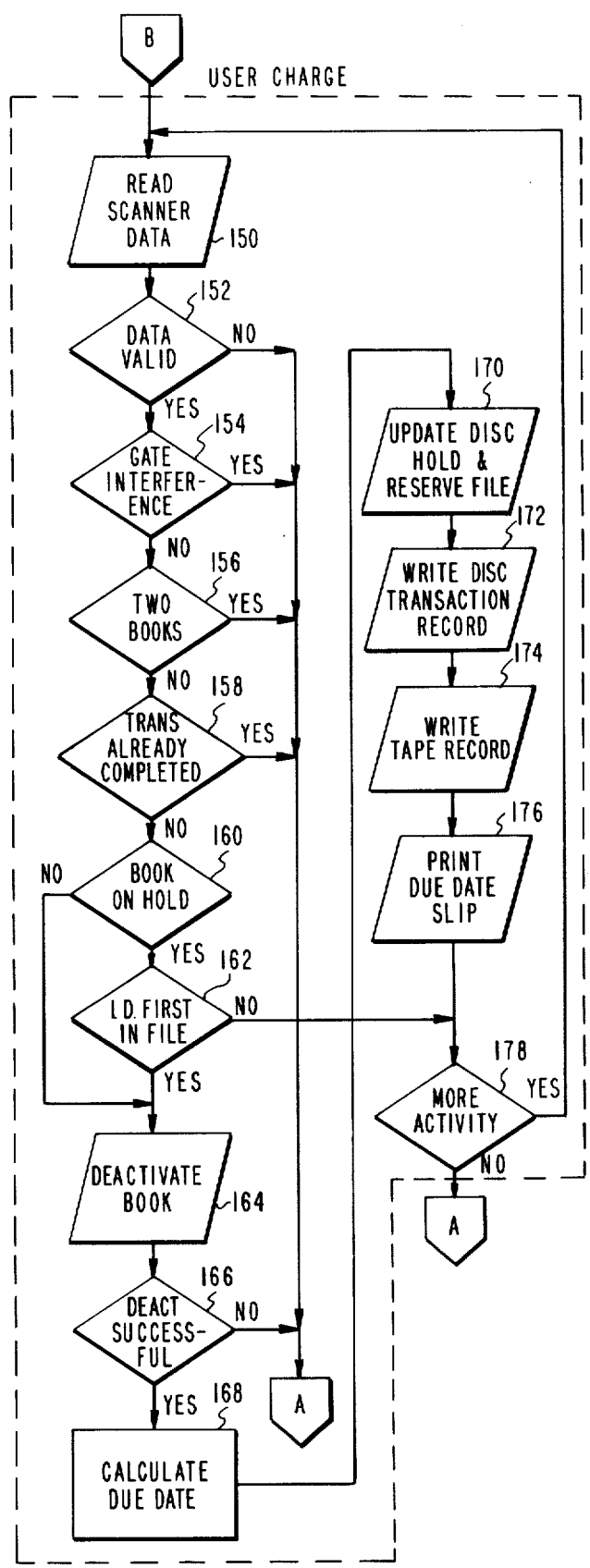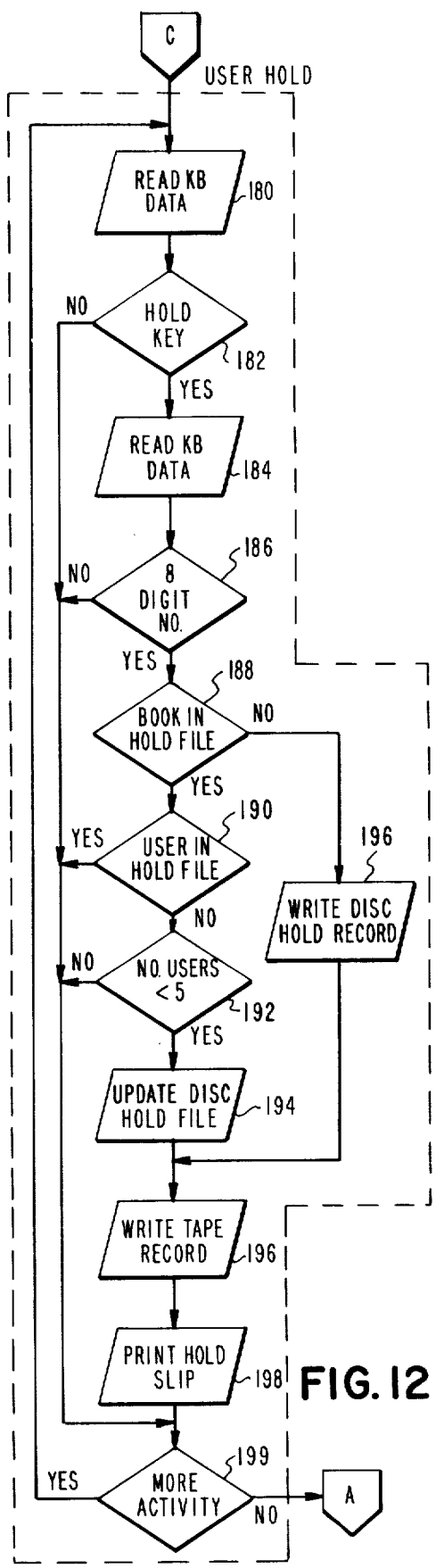
FIG. 11
FIG. 12

LIBRARY CIRCULATION CONTROL SYSTEM

BACKGROUND OF THE INVENTION

This invention relates to a library circulation control system and more particularly to a computer controlled system for processing library transactions and detecting unauthorized removal of library books.

In a conventional library system, books are checked out and otherwise processed manually and circulation records are maintained by manual entries on index cards. This process is slow and cumbersome and typically requires a substantial number of workers to keep the records current. Special functions such as placing books on hold or reserve, preparing lists of overdue books and fines, and taking inventory of the library stock requires additional substantial time and manpower. More sophisticated work such as preparing statistical reports about patrons and circulation are extremely difficult with manual systems. Moreover, additional personnel are required at each library exit to maintain security by checking all outgoing library materials.

Attempts at automating library functions have provided improvements but have lacked simplicity and completeness. The complexity of operating such systems has required that trained library personnel interface with the system input and output devices to insure accuracy. For example, the use of hand held optical readers for inputting patron and book data usually requires a trained operator to properly move the device in order to accurately read the input information. Moreover, prior automated circulation control systems do not include an integrated theft control feature. Systems providing for the detection of unauthorized removal of library items utilize separate units requiring additional steps which must be included with the procedures of a circulation control system.

SUMMARY OF THE INVENTION

The present invention is concerned with an automated library system combining circulation control and theft detection functions in one system. The input and output devices are designed for operation by untrained patrons for several simple functions such as charging out books, and can easily be switched to a different mode by librarians to perform additional more sophisticated tasks. The system utilizes a centralized computer for data processing and storage and remote terminals which can be conveniently located for easy patron use. Access to the terminals by patrons is provided by the presentation of an authorized patron identification card to the termial. The patron then performs the charging and security functions using the terminal without the aid of a librarian. The book is placed in a book tray where an identifying label on the book is read by an optical scanner mounted above the tray. At about the same time, a sensitized magnetic strip in the book binding is demagnetized to allow the book to be taken past magnetic detection devices at the library exits. The tray is structured to accept only one book during the charging and demagnetizing operations. Control of the terminal functions is conducted by the computer which also prepares and stores transaction records and performs other data processing functions. The terminals may be key accessed by librarians to generate, modify and interrogate data files in the computer, to override the automatic patron functions and to test the operability of the system. The transaction records and other data files is periodically communicated by the computer to a central data processor for updating master inventory files.

In accordance with one aspect of the present invention, a library circulation control system is provided for automatically charging library materials to authorized users of the system. Means are provided for generating first and second signals representative of the authorized user and an item of the library materials. Other means process the first and second signals to charge the library item against the user and to change the state of alterable means on the library item to represent a change in the circulation status of the item.

In another aspect of the present invention, a book processor terminal is used in an automatic library system having a computer to conduct transactions modifying the circulation status of library books for authorized users. The book is supported in housing means in a stationary position for processing. A code reader in the housing means adjacent to the supporting means reads indicia on the stationary book to identify the book and generate a first signal representative of the book indicia. A card reader in the housing identifies indicia on a user card inserted therein and generates a second signal representative of the card indicia. Means are provided for transmitting the first and second signals to a computer for processing.

In yet another aspect of the present invention, an automated library circulation control system includes data storage means for storing a set of data representative of library items and authorized users. Data processing means have first and second means for processing a set of data in response to first and second enable signals. Input means provide control data to the data processing means and include a first mode means for generating a first enable signal in response to a user who is authorized to enable only the first processing means. The input means further include a second mode means which generate a second enable signal in response to a user authorized to enable the first and second processing means. Switch means have first and second mode positions to provide mutually exclusinve actuation of the first or the second mode means.

In accordance with yet another aspect of the present invention, a processor for use in a library system controlling the circulation of a plurality of library items includes actuable means for changing an alterable element on each of the library items to modify the circulation status of the item in response to actuating signals from the library system. Support means hold one of the library items in a stationary position for the actuable means to change the alterable element. Detection means are associated with the support means to detect the presence of an object other than the one library item on the support means. A signal is provided to actuate the actuable means only when the detecting means indicates that only one library item is present on the support means.

Another aspect of the present invention, includes a system for controlling the inventory of a plurality of items, each having a first element identifying the item and a second alterable element identifying the inventory status of the item. Means sense the first element to determine its identity. Actuable means are provided to alter the second element to change its inventory status. Other means are responsive to the sensing means to actuate the actuable means.

In accordance with another aspect of the present invention, a label is provided for attaching to a library item. Visual indicia on one side of the label include a plurality of coded bars, each bar being representative of a decimal number to identify the library item. Means on the other side of the label affix the label to the item so that the label is removable from the item only by being damaged so that it cannot be affixed to another library item.

From the foregoing, it is apparent that the present invention provides several advantages over the prior art. The system of the present invention allows a patron to charge out library materials without assistance or supervision by library personnel, resulting in a savings of time and labor. The theft detection unit is an integral part of the circulation control system so that the demagnetization and magnetization of the detection strip in each book is accomplished during charging and discharging of the book without additional effort by the patron or the librarian. The charge out and desensitizing procedures are accomplished quickly and accurately by the use of a housing structure fixing the position of the scanning and activator units with respect to each library item. A further advantage is seen in the use of a mode switch, which allows the librarian to have direct access to the computer data storage in order to build and modify data files, provide special instructions to the computer controller and determine the readiness of each unit in the system. Additional security features are included in the system to maximize control and accuracy and to minimize attempts to "beat the system". The system is designed to generate data compatible with a remote central data processor and to transmit data to and from that processor periodically in order to utilize its greater capabilities. The system is easily expanded to include additional patron book processing stations, increased data storage capacity and different types of input/output devices. The system is particularly adaptable to other real-time applications at remote locations.

DESCRIPTION OF THE DRAWINGS

A more complete understanding of the advantages, structure and operation of the present invention may be had by referring to the following detailed description when taken in conjunction with the accompanying drawings, wherein:

FIG. 1 is a simplified block diagram showing the basic units of the present invention;

FIG. 2 is a pictorial view of the computer, console and book processor station of the present invention;

FIG. 5 is a front view of the book processor station of FIG. 2, showing the control panel, card reader and display unit;

FIG. 6 is a top plan view of a patron identification card used with the card reader shown in FIG. 5;

FIG. 7 is a partially cutaway perspective view of a portion of the book processor station of FIG. 2, showing the book tray and the activate/deactivate unit;

FIGS. 10 through 22 are flow diagrams showing the steps in the operation of the library circulation control system of the present invention.

DESCRIPTION OF THE PREFERRED EMBODIMENT

Figure 3:
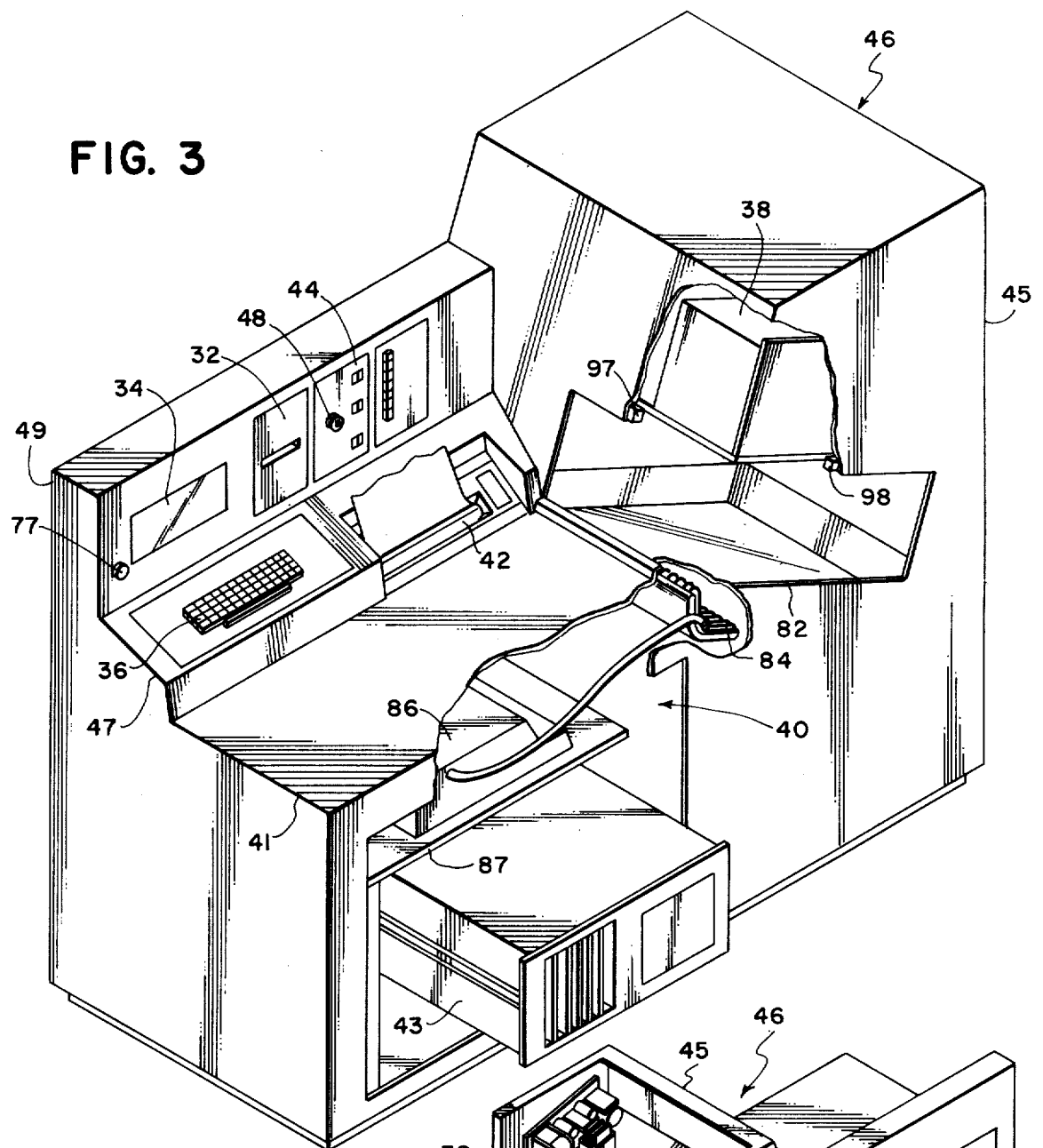
FIG. 3 is a partial cutaway front perspective view of the book processor station shown in FIG. 2.

A brief overview of the system and its operation will first be given. The system apparatus will then be described in detail followed by a description of the system operation. Referring to FIG. 1, a block diagram of the library circulation control system 10 of the present invention is shown.

The system 10 includes a library terminal 12 consisting of a computer 14 connected to a disc storage unit 16, a paper tape reader 17, a book processor station interface 18 and a central computer communications interface 22. Computer 14 is the controller for the system performing the necessary data processing functions for the system to operate as a library circulation control system. Data files concerning valid users, daily transactions, books on reserve, books on hold and fines paid are stored on disc storage unit 16. Book processor station interface 18 enables the computer 14 to communicate with each book processor station.

A system console 20 is in communication with library terminal 12 and includes a keyboard 24, a printer 26 and a dual cassette recorder 28. Keyboard 24 communicates directly with computer 14 on system startup and shutdown and certain other control functions not performed during normal system operation. Printer 26 logs the current status of the system and prompts the librarian for inputs. The daily transactions are recorded by cassette recorder 28 on a cassette cartridge to provide a backup for the data files stored on disc storage unit 16.

The central computer communications interface 22 permits the transfer of all the data files on the disc storage unit 16 to a central computer at a remote location for updating user records, determination of overdue status, and other operations. This transfer is normally made after closing hours while the book processor stations are not being used. When the central computer completes processing of the data, the files are updated and transferred back to the library terminal after which the book processor stations resume operation utilizing the new data.

The book processor stations interface 18 is connected to a plurality of book processor stations 30 for charging and discharging books and for displaying and modifying the computer data files. Each station 30 includes an identification card reader 32, a display unit 34, a keyboard 36, an optical scanner 38, a book activate/deactivate unit 40, a printer 42 and a control panel 44. A station logic unit 43 interfaces between each of the station components and library terminal 12. Logic unit 43 coordinates the transfer of data, control signals and status signals between the library unit 12 and the components of station 30.

Card reader 32 reads an identification card which provides access for the user or librarian to station 30. The identification card is inserted in card reader 32 and a ten digit number on the card is matched with an authorized number in an appropriate data file before a transaction can be performed at the station.

Display unit 34 provides alphanumeric messages to prompt the user or librarian on the use of book processor station 18. Specific step-by-step instructions are displayed for each function that is performed. Keyboard entries by the operator from keyboard 36 are displayed as entered. Additional messages, such as confirmation of action and file data are displayed as requested.

A bar-coded label on each book representing the book circulation number is read by optical scanner 38. The book is oriented in a book tray at the station with the label facing up and the spine of the book facing the front of the station. Scanner 38 reads a nine digit number on the label and generates signals representing the number which are transferred to computer 14.

Activation and deactivation of a magnetic strip in a book is performed by the activate/deactivate unit 40 located under the book tray. The strip located in the spine of each book is demagnetized when the book is charged or checked out and magnetized when the book is discharged or returned. Deactivation of the strip occurs on command from computer 14 after it is determined that the user is permitted to charge the book. Failure of the user to deactivate the strip before taking the book from the library will initiate an alarm at the library exit.

Date due and book-on-hold confirmation messages are printed out by printer 42 for the user. Included in the date due message is the user's identification number, the book number, the date charged, and the date due. If a book has been placed on hold, the hold print-out includes the user identification number, the book number, and the date that the hold request was entered.

Control Panel 44 provides for selection of librarian or user operation modes using a keylock switch. Other functions which may be selected in the librarian mode include a switch for manual or automatic operation and a switch for manually charging or discharging a book. Another switch provides a manual eject for the identification card. Status information displayed on the control panel in the librarian mode indicates that the ID card is in place, the book is in place, the book is activated, the book is deactivated, there is gate interference, two books are presented, and the printer is out of paper.

To charge a book a patron inserts his identification card in card reader 32 to be automatically read and checked against a patron file containing the numbers of all valid library patrons. If the patron's number is not found in the file, the transaction will not proceed and the alphanumeric display unit 34 advises the patron to consult the librarian in order to charge out the book. The patron is also prevented from charging out any books if his record indicates that he has maximum number of books on loan, has overdue books, or has had library privileges suspended. In any of these cases, the librarian has the capability to override the transaction if desired.

Assuming that the patron's identification is accepted, the patron then inserts the book in the book tray with the spine next to the activator/deactivator unit 40 and the bar code label facing up. The book circulation number is read by optical scanner 38 and checked against the list of books in the hold data file on disc storage unit 16. If the circulation number is found in the hold file, the computer will check the number of the first requester. If this requester number matches the number on the patron identification card currently in the machine the requester number is removed from the hold file which is updated and rewritten on disc storage unit 16. Otherwise, the patron is advised by the display to consult the librarian. If the circulation number is not found in the hold file the computer is authorized to proceed. To deactivate the detection strip in the book, the library control terminal 12 sends a signal to activator/deactivator unit 40 which then desensitizes the detection strip in the book. If the patron attempts to insert two or more books simultaneously in the book tray, the top books will slide out of position since the book tray is sloped. The bottom book is held in place by a rough surface with a high coefficient of friction. The tray includes a number of photoelectric devices around its periphery so the additional books cannot be held in place by the patron.

After the book strip is deactivated a date due slip is printed by printer 42. The loan period previously entered into the system by the librarian is used to calculate the date due for the patron unless the hold record shows more than two requester numbers or the circulation number is found in a reserve file. In these cases the date due is a shorter loan period. A transaction record is entered in disc storage unit 16 and cassette recorder 28 after each transaction is completed. Each record includes a charge code, patron number, date due, and circulation number.

The detection strips of returned books are reactivated by the librarian inserting a special card in reader 32 and then properly placing the book in the book tray. The bar-coded label is read and the book detection strip is reactivated. The check-in or discharge transaction is entered on disc storage unit 16 and cassette recorder 28 and includes a discharge code, book number, date and time.

A patron can also use his identification card to place a book on hold. After inserting the card in card reader 32, the patron depresses the "HOLD" key, types in the book number on station keyboard 36 and confirms the number by observing the output of display unit 34. If the number is valid, the entry of the data is recorded in the hold file.

The library staff is able to perform a number of additional functions by turning a key-locked switch on control panel 44 to the "Librarian" position. In this position, the librarian types in a four digit alphanumeric code on keyboard 36 indicating the function to be performed. The library control terminal 12 responds by displaying sequential instructions on display unit 34. The librarian responds with appropriate inputs on the alphanumeric keyboard 36, such as by entering a patron code or a book number. The patron is locked out of this mode since a key is required to operate the mode switch.

In the librarian mode, the library staff is able to remove a requester from the hold file by typing in a code, the requester's card number, and the book number. The librarian can also add books to the reserve file by typing in a code, the book number and the number of days or hours of the loan period. In a similar fashion the librarian can remove books from the reserve file by entering the reserve code and the book number. Other functions which can be performed in the librarian mode include adding or deleting a number in the patron file, overriding the charge and discharge operations, displaying the contents of the reserve file, displaying or entering the time of day and writing the time record file, interrogating the transaction file by circulation number, and entering the date due. In addition, by using a telephone link the librarian can transfer data files to and from a remote central computer using system console 20.

Referring now to FIG. 2, a perspective view of library circulation control system 10 is shown. Although library terminal 12, system console 20 and book processor station 30 are shown grouped together, it is understood that each unit may be located remote from the others with interconnecting communication links.

Library terminal 12 includes computer 14, disc storage unit 16, paper tape reader 17, book processor stations interface 18 and central computer communications interface 22. Each unit of terminal 12 is preferably a conventional system suitable for the particular library application described herein. The units are preferably vertically stackable, as shown, to conserve space.

Programmable computer 14 is preferably a microprogrammable data processing system such as the HP 21-M/20 2108A Microprogrammable Processor manufactured by Hewlett Packard, as described in Hewlett Packard HP21MX Computer Series Reference Manual, publication number 2108-90002, although other suitable processors may be used. Some of the preferred features of computer 14 include 128 standard instructions, 32K word semiconductor memory, memory parity, extended arithmetic function, power fail/auto restart with two hour battery backup for memory, 64 word ROM bootstrap loader to disc, 25 input/output channels (nine in mainframe and sixteen in I/O expansion chassis), operator panel, memory protect, time base generator, dual-channel direct memory access, and privileged interrupt.

Below computer 14 is disc storage unit 16. This unit preferably provides 2.45 million bytes (1.225 million words) of storage capacity. It is understood that storage capacity requirements are a function of the amount of data to be stored. The moving head unit contains one removable cartridge disc which is permanently in a cartridge for protection against contamination and damage. The disc unit 16 interfaces with computer 14 via two input/output slots (not shown). A suitable system for the disc storage unit is the Hewlett Packard HP 12961A Cartridge Disc Subsystem as described in Hewlett Packard Operating and Service Manual HP12961-90001. The disc is utilized to store all data files, operational programs and diagnostics, leaving part of the disc capacity available for future expansion. Preferably, the disc storage capability is expandable to at least 17.2 million bytes by the addition of drive units.

The paper tape reader 17 above computer 14 may be a Hewlett Packard HP 12925A High Speed Punched Tape Reader as described in Hewlett Packard Operating and Service Manual HP12925-90001. The reader 17 is a photoelectric unit interfacing with computer 14 which will read an eight level code on one inch wide tape at 500 characters per second. Reader 17 is utilized primarily for software development and loading diagnostics to test the hardware. Reader 17 is optional, being required primarily if the system software is furnished in punched paper form.

The central computer communications interface 22 provides the necessary hardware to manually connect computer 14 to a synchronous modem and telephone line to a central processing computer (not shown) such as an IBM 370/155 computer. A suitable unit is the Hewlett Packard HP 12618A Synchronous Data Set Interface as described in Hewlett Packard Operating and Service Manual HP12618-90001. Due to the infrequent usage of the link in the present system configuration, a dial-up link to the central computer is preferred. A synchronous data set is required such as the Bell 201C. Data transmission rate is from 2400 to 9600 baud, but 2400 baud is prefered since it will provide more reliable transmissions, allow use of less expensive data sets, and achieve transmission of the data files within a reasonable time frame. Transfer of the files is initiated by a librarian dialing the telephone number of the central computer link and, after receipt of a tone indicating answer, placing the telephone on an acoustic coupler. The librarian then enters predetermined key words on system console 20 located adjacent to computer 14 initiating the transfer. When the transfer is complete the operator is informed and if errors are detected in transmission, the transmission is repeated up to ten times. The transfer to and from the central computer is performed while system 10 is off-line and is part of the daily start-up and shut-down procedure.

The book processor stations interface 18 (shown in FIG. 1) is preferably an asynchronous sixteen channel multiplexer, interfacing between book processor stations 30 and computer 14. A unit compatible with the previously mentioned HP Microprogrammable Processor is the Hewlett Packard HP 12920A multiplexer as described in Hewlett Packard Operating and Service Manual HP12920-90001. The multiplexer consists of three printed circuit cards mounted in the computer mainframe. Interface 18 transmits and/or receives eleven bit asynchronous data which includes a start bit, seven data bits, a parity bit and two stop bits. Each channel under program control is set for any data rate from 57 to 2400 baud. The multiplexer interface 18 performs serial/parallel data conversions so that data is transferred to and from computer 14 in eight bit increments, thus minimizing computer overhead.

Each processor station 30 utilizes a single channel of multiplexer interface 18 with data communications at a 2400 baud rate. Data transmissions to processor station 30 are directed to one of the component units of station 30 by preceding the data with an address corresponding to the unit to receive the data. Selectable component units for each station to receive data transmission include the alphanumeric display unit 34, printer 42 and activate/deactivate unit 40. Data transmission from processor station 30 is possible only by command from computer 14. Units which can transmit data to computer 14 include keyboard 36, card reader 32 and optical scanner 38. Status information is also transmitted from control panel 44 to computer 14.

Console 20 preferably includes a 30 character-per-second thermal printer 26, an alphanumeric keyboard 24, and a dual cassette recorder 28, all interfaced with computer 14. A suitable unit for system console 20 is the 733ASR Silent 700 Data Terminal manufactured by Texas Instruments as described in Texas Instruments Operating Instruction Manual TI 959227-9701. A solid state thermal print head of printer 26 provides quiet operation. Console 20 preferably utilizes MOS/LSI integrated circuits and a minimum of moving parts for high reliability and fast print speeds. Keyboard 24 includes two key roll-over to minimize operator errors. Cassette recorder 28 preferably has two cassettes each containing 300 feet digital grade magnetic tape to provide a maximum storage capacity of 155,000 characters per track or 310,000 characters per cassette. The system console printer 26 and keyboard 24 are utilized for entering system commands to access and modify data files, transfer files to and from the central computer, start up the system, perform diagnostic testing and develop programs.

Figure 4:
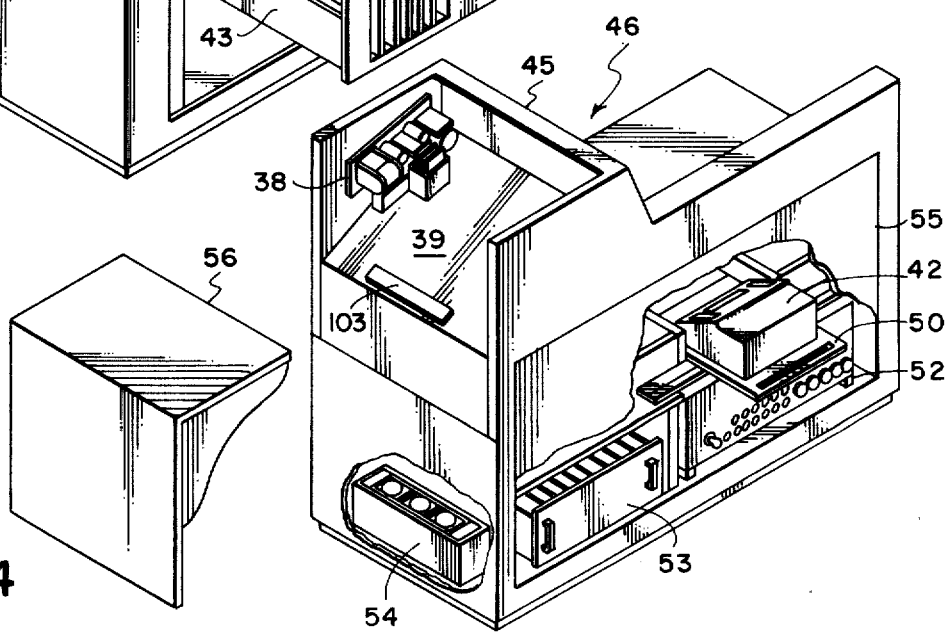
FIG. 4 is a partial cutaway back perspective view of the book processor station shown in FIG. 2.

The book processor station 30 is shown in greater detail in FIGS. 3 and 4. Each station is enclosed in an integral cabinet 46, preferably mounted on wheels for easy movement. Each station 30 includes card reader 32, alphanumeric display unit 34, keyboard 36, optical scanner 38, activate/deactivate unit 40, printer 42, and control panel 44. A key-operated switch 77 allows the librarian to turn the station on and off, and a second key-operated switch 48 enables the librarian to switch to the "Librarian" mode to perform special functions. Cabinet 46 includes a flat, substantially horizontal work area 41, enclosing station logic unit 43, a vertical portion 49 behind area 41 enclosing card reader 32, display unit 34, control panel 44 and switch 48. A raised portion 47 between area 41 and portion 49 contains keyboard 36 and printer 42. A side portion 45 integral with the rest of cabinet 46 includes a slanted book tray 82, and enclosed portions above and below the tray for enclosing scanner 38 and activate/deactivate unit 40, respectively.

As best seen in FIG. 4, printer 42 is placed on a sliding shelf 50 for easy access from the rear of cabinet 46. A conventional power supply 52 is also accessable from the rear of cabinet 46, preferably capable of supplying five volts at 6 amperes, plus and minus 12 volts at 0.8 amperes, minus 250 volts at 0.1 amperes and 24 volts at 1.6 amps. A conventional logic unit 53 is provided adjacent to power supply 52 to interface between system logic unit 43 and optical scanner 38. A fan 54 is provided adjacent logic unit 53 to cool the book processor station 30. A rear door 55 on cabinet 46 may be removed to access the units. A side door 56 is removable to provide access to scanner 38. A front door 57, shown in FIG. 2, may be removed to reach logic unit 43 and activate/deactivate unit 40. Doors 55, 56 and 57 are preferably key locked to prevent unauthorized tampering with the station units.

A card reader 32 is provided for reading the identification number of a patron from his personal identification card. Card reader 32 is preferably an optical static unit capable of reading a ten character Hollerith code, such as model ZU100RH-3Z1 manufactured by Panasonic as described in Panasonic brochure 1CD-72-001 Reader 32 is mounted in the vertical portion 49 of cabinet 46 adjacent display unit 34 and above keyboard 36. A more detailed view is shown in FIG. 5. Access to a card reader 32 is provided by slot 48 for insertion of a patron identification card 58. A sensor inside slot 48 indicates that the patron card is in the proper position for reading and initiates a scan which transmits the ten digit numeric patron number to computer 14. After being read, the card is ejected via the computer control within a fixed time after completion of the transaction.

The patron identification card 58 is shown in greater detail in FIG. 6. Reader 32 will preferably accept patron cards with overall dimensions of 3.25 inches by 2.34 inches, with flat square parallel sides. A cut corner 59 assures proper orientation of card 58 in reader 32. A unique patron number is punched in columns 1 through 10 and rows 0 through 9, as shown. The remainder of the card area can be used for other purposes as desired. The use of an optical card reader in the present system is preferable since reading is not dependent on mechanical contacts which tend to accumulate dirt. The only maintenance required is periodical cleaning of the glass surface above the light source.

Alphanumeric display unit 34 and keyboard 36 of station 30 provide the primary man/machine interface between the patron or librarian and computer 14. Display unit 34, best seen in FIG. 5, displays appropriate messages to instruct the patron or librarian of the steps to be taken in performing a function. Display unit 34 may be a Burroughs Self-Scan Panel Display Subsystem Hi-Contrast Type BDS40832H200 as described in Burroughs Maintenance and Repair Manual BDS-40832-200, with the capability of displaying 256 alphanumeric characters (32 characters per row for eight rows). Display unit 34 is mounted in vertical portion 49 of cabinet 46 at a convenient height for the patron or librarian. Unit 34 is mounted at an angle for easy viewing by a standing patron, and a polaroid screen is placed in front of the display to minimize glare from overhead lights.

Keyboard 36, shown in FIG. 3, inputs data from the patron or librarian to computer 14. The patron may enter a ten digit number to place a book on hold, and the librarian can enter data, change operating modes, request data display, and enter "trouble-shooting" messages during diagnostic testing. Alphanumeric keyboard 36 has a standard typewriter keyboard with additional special keys as required to communicate with computer 14. The keyboard employed may be a Microswitch model 67SW5-17 as described in Microswitch Product Sheet 67SW5by Micro Swich Co., using a seven bit ASCII code plus parity. Keyboard 36 is interfaced to computer 14 such that the keyboard will operate in a character mode, with all displayable entries being shown on display unit 34. Thus all keyboard entries can be visually confirmed by the operator before initiating action. Keyboard 36 is recessed in cabinet 46 toward the back on raised portion 47 in front of vertical portion 49. Mounting in this position minimizes the possibility of damage to the keyboard due to carelessness, such as briefcases being thrown on top of the counter.

Control panel 44 shown in FIG. 5, enables the librarian to control the mode of operation of book processor station 30, to manually override the automatic functions, and to diagnose system difficulties. Panel 44 includes a control portion 60 with four switches 62–65 and a status portion 66 adjacent the control portion with seven status indicators 70–76. In the control portion a key operated switch 62 has two modes. The "Librarian" mode allos the librarian to perform transactions other than those which the patron can perform, such as discharging a book, adding a number to a patron file, or operating the activate/deactivate unit 40 manually. This mode also enables the remainder of the switches and indicators on control panel 44. In the "User" mode, simple functions can be performed by a patron, such as charging a book and placing a book on hold.

An "Auto/Manual" two position rocker-arm switch 63 is provided to place station 30 in an off-line manual mode, which is enabled only when switches 62 and 63 are in the "Librarian" and "Manual" modes, respectively. In the "Charge" position switch 64 enables the librarian to manually deactivate book strips by inserting a book into the book tray breking a light beam on activate/deactivate unit 40. In the "Discharge" position the librarian can manually activate book strips for manual check in. The book identification number must be manually recorded in both modes. Finally, an "ID Release" momentary switch 65 initiates manual ejection of an identification card 50 from the card reader slot 48.

Referring now to the status indicator portion 66, seven indicators are shown, the first six being enabled only when switch 62 is in the "Librarian" mode. An "ID In Place" indicator 70 is on when a patron identification card 50 is properly inserted in the card reader slot 48. Below indicator 70, a "Book In Place" indicator 71 is provided for indicating when a book is properly positioned in the book tray for sensitizing or desensitizing and reading of the bar coded label. A "Book Activted" indicator 72 is on when the detection strip of a book is sensed as being activated. For proper indication, the book must be in the correct position in the book tray. A "Book Deactivated" indicator 73 is provided to turn on after the magnetic strip in a book in the book tray has been deactivated.

As will be described later, the book tray has several detectos around the periphery to indicate when there is interference with the book tray. A "Gate Interference" indicator 74 turns on when the periphery of the tray has been crossed by any object. A "Two Books" indicator 75 is provided to turn on when more than one book is positioned in the book tray. Finally, a "Printer Out of Paper" indicator 76 informs the operator when the thermal printer 42 has run out of paper.

Referring to FIG. 3, printer 42 is provided adjacent keyboard 36 and below control panel 44 to print out information for the patron at book processor station 30, such as date-due slips after a book has been charged to a patron. After each printout the printer automatically feeds a sufficient number of lines to allow the patron to tear off the printed information. Printer 42 may be a model 755RO Silent 700 manufactured by Texas Instruments as described in Texas Instruments Operating Manual TI 969536-9701. The unit preferably includes a 30 character per second non-impact thermal printer utilizing the same print mechanism as printer 26 in system console 20.

Referring to FIGS. 3 and 7, the activate/deactivate unit 40, book tray 82 and interference detection gates of book processor station 30 are shown. Unit 40 and tray 82 are enclosed within side portion 45 of housing cabinet 46. A slanted book tray 82 is contained in portion 45 with an electromagnetic coil 84 disposed immediately under the upper portion of tray 82. Coil 84 is connected to a capacitor bank 86 sitting on a shelf 87 beneath work portion 41 of cabinet 46 and activatable by computer 14. As shown, coil 84 is disposed with one portion 88 running substantially parallel to the bottom of tray 82 and a second portion 90 at approximately a right angle to portion 88 running substantially parallel to the upper side of tray 82. Activate/deactivate unit 40 is used to sensitize or desensitize a magnetic detection strip in a book placed in tray 82. A suitable system for unit 40 is Model 31-B2 manufactured by 3M Company as described in 3M Technical Specifications N-T74SpB(14.3) Jr.

A row 92 of obstruction detection light emitters extends along the upper edge of tray 82 and a second row 94 of emitters 96 is located on the slanted side of tray 82 along the front of station 30. The light emitters 96 comprises photoelectric cell emitters directing infrared light beams to corresponding rows 97 and 98 of infrared light receivers as shown in FIG. 3. When a light beam between one of the light emitters 96 and a corresponding light receiver is broken, it indicates the presence of an object such as a hand in the vertical plane along the outer edge of the book tray 82. This gate system detects possible interference with the scanning or activate/deactivate operations and thereby disables the system. Additional light emitters 100-102 are shown inside book tray 82 in the lower portion to detect any books or objects that have fallen to the bottom of the tray. A corresponding row 103 of light receivers are located above emitters 100-102 in the slanted base 39 of cabinet portion 45 to receive the light emissions. When objects are sensed in the bottom of tray 82, the system is disabled so as to not proceed further with an activation or deactivation function. Tray 82 further includes several friction strips 104 located parallel to each other near the top of tray 82 to hold a library book 106 in position to be processed. If further books are placed on top of book 106, they will slide by gravity to the bottom of tray 82 thereby breaking the light beams between emitters 100-102 and the row 103 of light receivers.

Figure 8:
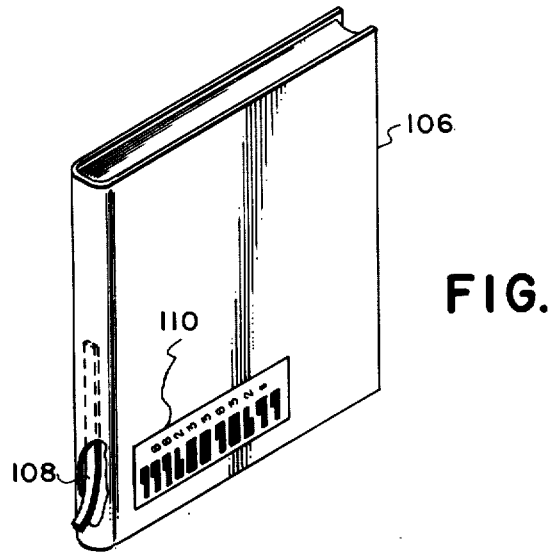
FIG. 8 is a partially cutaway perspective view of a library book shown in the magnetic detector strip and the bar coded label on the book.

As shown in FIG. 8, each library book 106 includes a magnetic detector strip 108 inserted in its spine. The strip 108 is designed to be magnetizable and demagnetizable by electromagnetic coil 84 to change the circulation status of the book. Preferably, two types of strips may be used. A permanently sensitized strip is used in connection with materials which are not to be taken from the library under any circumstances. For books that are to be charged in and out of the library, a strip is used which can be magnetized or demagnetized. Typically, the strips may be obtained in large quantities from a number of manufacturers and should be compatible with detection equipment located at the library exits. One suitable system is the 3M TATTL-TAPE detection system as described in 3M Technical specifications N-T74SpB(14.3)JR, which includes magnetic strips and compatible detection equipment at each exit.

Upon receipt of a command signal from computer 14, the activate/deactivate unit 40 magnetizes or demagnetizes the magnetic strip 108 in book 106. Feedback is provided to computer 14 to indicate the new status of magnetic strip 108. The unit 40 will not detect the presence of two books if they are simultaneously placed in the book tray 82. However, due to the slope of the bottom of book tray 82, under normal conditions, only the bottom book will remain in position to be processed, held by friction strips 104. Additional books will slide to the bottom of the tray and will be detected so as to stop the check-out process. If a patron attempts to hold several books in the processing position, the rows of emitters 92 and 94 and receivers 97 and 98 will detect the interference and stop the process.

As further shown in FIG. 8, a bar coded label 110 is affixed to the front cover of library book 106, positioned in the lower left hand portion of the cover surface 1.5 inches from the left side and 1.5 inches from the bottom of the book. Label 110 is bar coded with a nine digit machine-readable code, including a modulo 9 check digit and also inclues the arabic numeral equivalent on the right side of each bar. Each bar is shaped to represent a decimal number from 0 to 9, by different thicknesses and by discrete variations in thickness along the bar length. The check digit represents a number which, when added to the numbers represented by the other eight bars, provides a sum divisible by nine. The labels are preferably made of an easily destructable paper with a strong adhesive on the reverse side. The adhesive is sufficiently strong to adhere to book 106 so that attempts to remove the label 110 from book 106 will damage the label so that it cannot be reused. As an alternate approach, the bar code could be printed directly on the cover of book 106 or on one of the pages therein.

Figure 9:
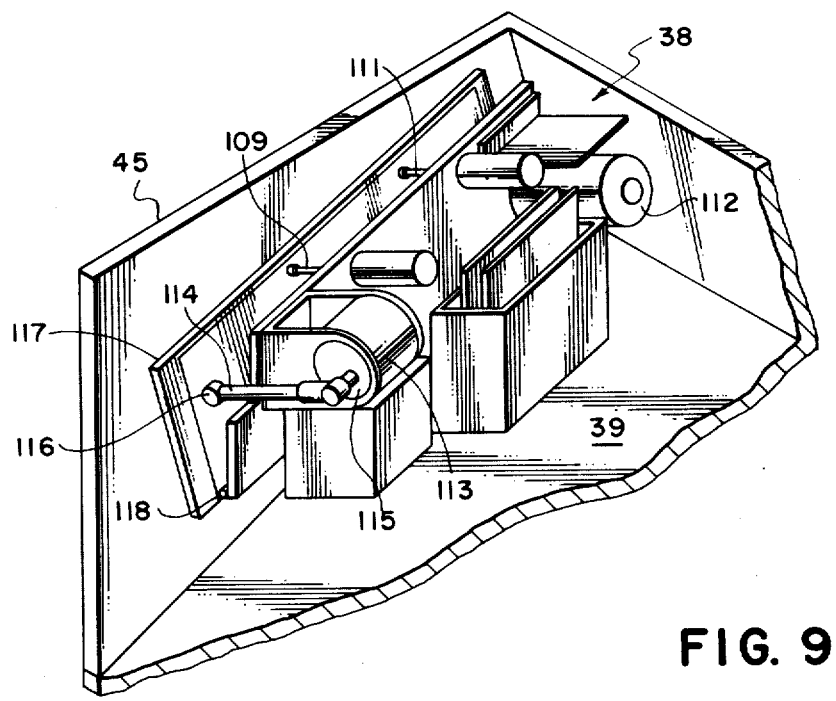
FIG. 9 is a partial cutaway perspective view of the book processor station of FIG. 2 showing an optical scanner.

With reference to FIG. 9, the optical scanner 38 of the present system is shown in greater detail. Scanner 38 is positioned in side portion 45 of housing 46 directly above tray 82 so as to scan label 110 on a book 106 in the book processing position. Preferably, scanner 38 utilizes a laser beam to scan and detect the code pattern, as in Model 441-8 manufactured by Accu-Sort Systems as described in Instruction Manual Number 441 by Accu-Sort Co. An aperture (not shown) is cut in the slanted floor 39 of housing portion 45 above tray 82 for the scanner to project its sweeping light beam to label 110. The unit first locates the code pattern on label 110 then reads and verifies the information on the label. The scanner 38 is bidirectional and allows the bar coded label 110 to be located within one inch of the preferred location. Scanner 38 is also able to read labels which are skewed up to 10 degrees from the preferred orientation shown in FIG. 8. The scanner preferably has a variable depth field capability allowing it to read books up to eight inches in thickness.

The scan cycle is initiated by a signal from a photocell (not shown) in book tray 82 which senses the presence of book 106 in the processing position. Scans which produce two consecutive identical readings are required before the eight digit number is transmitted to computer 14. The ninth digit on label 110 is a modulo nine check digit to insure accuracy in reading. The optical scanner also detects and flags damaged or missed codes and scanner malfunctions. The scanner preferably utilizes a helium/neon light source which is continually monitored to detect deterioration of the light output requiring replacement before significant errors can be produced. A synchronous motor 112 located near the front of scanner 38 drives a multi-faceted mirror assembly (not shown) to provide a unit-directional sweep of the light beam. A second synchronous motor 113 is located at the opposite end of the scanner assembly to provide the second direction of sweep for the light beam. An output shaft 114 is eccentrically mounted on an output plate 115 of motor 113 and is connected at its opposite end 116 to a stationary plate 117 attached to the side of housing portion 45. The entire assembly of optical scanner 38 is pivotally mounted on a pivot 118 and secured in a centered position by two spring loaded arms 109 and 111. Thus, as output plate 115 of motor 113 turns the eccentrically connected shaft 114 causes the entire assembly to pivot about pivot member 118 thereby sweeping the light beam through a second direction to read the bar coded label.

Figure 9A:
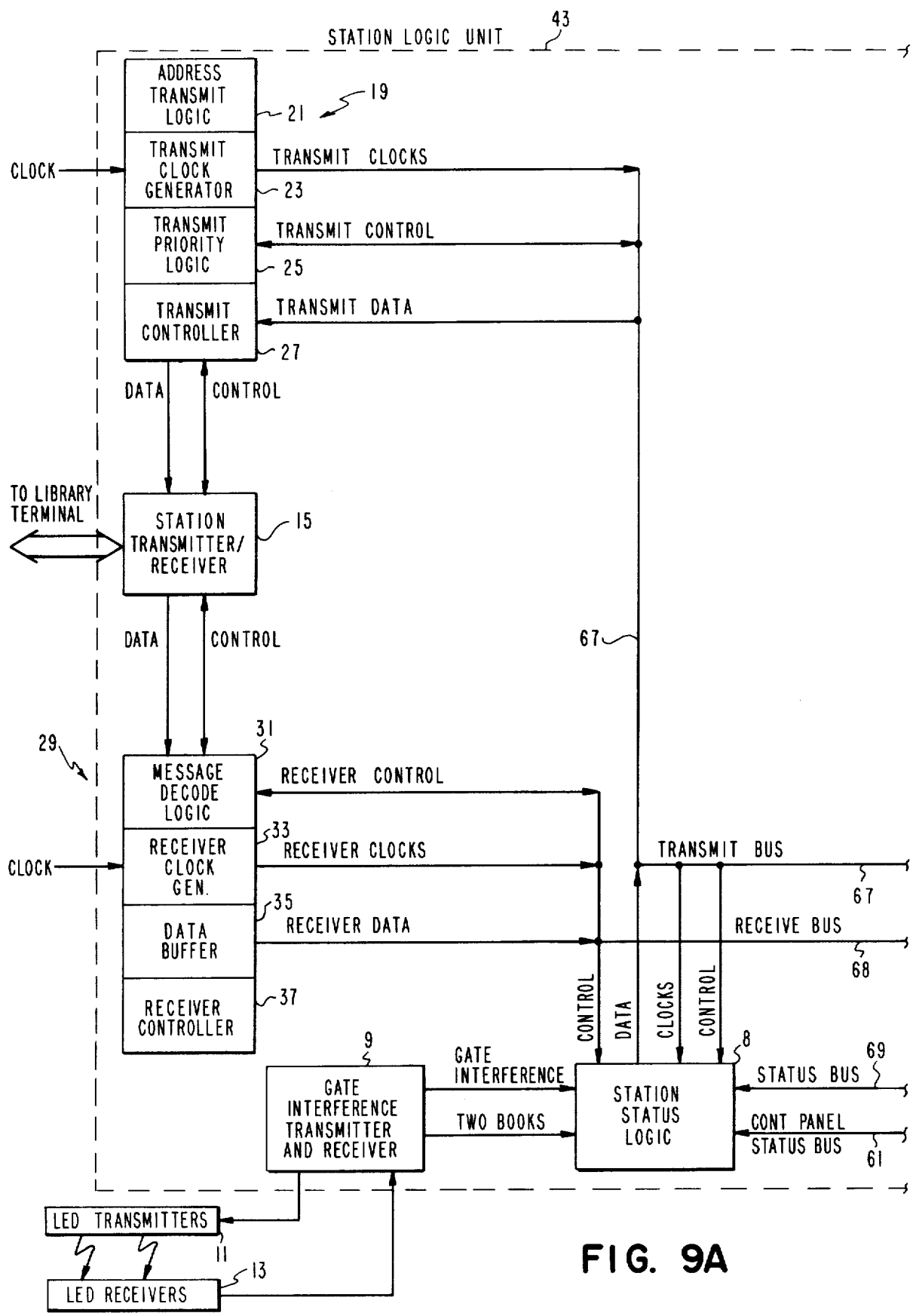
FIGS. 9A and 9B are block diagrams showing the logic interfacing of the components of the book processor station of FIG. 2 with the rest of the system.
Figure 9B:
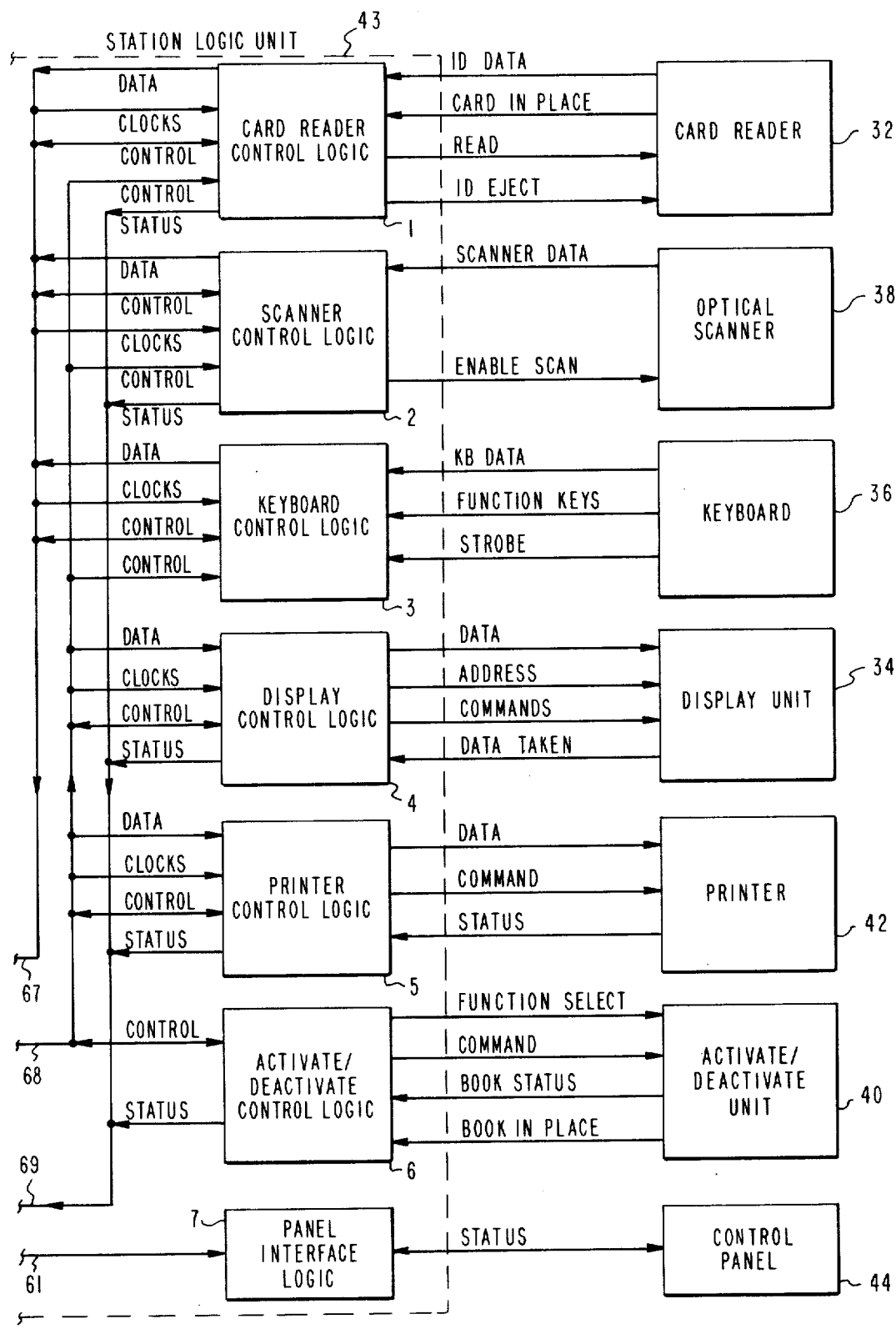

Referring now to FIGS. 9A and 9B, a block diagram of station logic unit 43 is shown. A brief overview of the interconnection between the components shown will be given, followed by a more detailed description of the configuration and operation of each of the components. Logic unit 43 coordinates the functions of the components of book processor station 30 -- the card reader 32, optical scanner 38, keyboard 36, display unit 34, printer 42, activate/deactivate unit 40 and control panel 44 -- and interfaces between those components and library terminal 12. Each of the components interface with a control logic unit 1-7, respectively, to communicate data, control and status signals. Each of control logic units 1-7 include the necessary processing circuitry to interface with its respective station component, as well as buffers and serial/parallel conversion circuitry as required. Card reader 32, optical scanner 38 and keyboard 36 each pass data from input sensors to the respective control logic units. Display unit 34 and printer 42 receive data from the respective control logic units for display to the user. The activate/deactivate unit 40 provides data to control logic unit 6 indicating whether a magnetic strip in a book has been activated or deactivated. Control panel 44 provides no specific data input to its respective logic unit 7. Each of the station components also provide a status signal to the respective control logic units and receive control commands actuating the components. The control panel provides and receives status information including signals directing a change in the status of the system operation.

The card reader control logic unit 1, scanner control logic unit 2 and keyboard control logic unit 3 are connected to a transmit bus 67 for transmitting data to and receiving clocking and control signals from a transmitter logic unit 19. Transmitter logic unit 19 includes an address transmit logic circuit 21, a transmit clock generator 23 having a clock input from a system clock (not shown) and outputting clock impulses to the transmitting components, a transmit priority logic circuit 25 providing transmit control signals for the station system, and a transmit controller 27 receiving the data transmitted from the station components. Each of logic units 1-6 are connected to a receive bus 68 which feeds data to display control logic unit 4 and printer control logic unit 5 and which directs clocking and control signals to each of logic units 1-6 from a receiver logic unit 29.

Receiver logic unit 29 includes a message decode logic circuit 31 providing receiver control signals for the station, receiver clock generator 33 having a clock input from a system clock (not shown) and outputting clock impulses to the receiving components, a data buffer 34 for outputting receiver data to logic units 4 and 5, and a receiver controller 37. Each of logic units 1-7, except unit 3, ar connected to a status bus 69 running to a station status logic unit 8. A second two-way status bus 61 runs between panel interface logic 7 and the station status logic unit 8. The station status logic unit 8 also receives clocking and control inputs from transmit bus 67 and receive bus 68 and outputs data representing the status of the station to transmit bus 67. The station status logic unit 8 receives further status input signals from gate interference transmitter and receiver 9 which monitors light emitter diode transmitters 11 and light emitter diode receivers 13 to determine the operational status of book tray 82. Transmitters 11 and receivers 13 include the emitters 92, 94, 100-102 and receivers 97, 98 and 103 discussed in connection with FIGS. 3 and 7.

Transmitter logic unit 19 and receiver logic unit 29 are each connected to a station transmitter/receiver 15 which interfaces with library terminal 12. Outgoing data is transmitted from transmitter logic unit 19 to transmitter/receiver 15 for conversion to an appropriate multiplexing format, and incoming data is received by transmitter/receiver 15, converted and transmitted to receiver logic unit 29. Control signals flow both directions between each of units 19 and 29 and station transmitter/receiver 15. Data flow to and from the library terminal is preferably at 2400 baud in an eight-bit asynchronous data format.

In operation the system of the present invention utilize several standard system software packages together with special application processes developed for particular functions of the present system. It is understood that the application processes may be embodied in application software or analogous hardware circuitry to perform the same functions within the scope of the present invention. The flow charts for these applications processes are shown in FIGS. 10–22 with the understanding that the specific design of hardware circuitry or software programming is easily within the grasp of one skilled in the art and having access to the flow charts.

The systems software preferably includes a real-time disc operating system, a data management system, a terminal control system and a job entry processor. Other systems software packages may include a sort-/merge routine, input and output drivers and a station emulator for interfacing with the remote central computer. The special applications processes are designed for communication between the computer 14 and the book processor station 30 to pass data such as patron number and book number to the systems software, process responses from the systems software to take appropriate action and perform other interface tasks as required. Special diagnostic processes for the system are provided as part of the applications processes.

Suitable standard systems software modules are available in the market. To be compatible with the Hewlett Packard computer previously mentioned, Hewlett Packard software may be used, including the DOS-III Disc Operating system as described in Hewlett Packard DOS-111 Reference Manual HP24307-90006, the IMAGE/2000 Data Base Management System as described in Hewlett Packard IMAGE/2000 Reference Manual HP24376-90001, the TCS Terminal Control System as described in Hewlett Packard TCS Terminal and Applications Manual HP24342-90001, and the RJE Remote Job Entry Processor System as described in Hewlett Packard HPRJE Manual HP24380-90001. The disc operating system software controls data and execution flow, handles operator/system and device/system interfaces and manages the disc file functions. The software also provides for batch programming, data communications support, programmatic modification of files and buffer management, among other functions.

The data management software system, such as the HP IMAGE/2000 Data Base Management System, is a set of software subsystems for generating, accessing, modifying, and reporting on all data files. Data files of the present system include the Patron file, Librarian file, Hold file, Reserve file, Transaction file and Fines Paid file. The data management system operates under control of the disc operating system which allows single-user access to the system. Calls to and from the files are made utilizing the special applications programs. Upon passing the necessary parameter, such as a patron identification number or a book number, system control is transferred to the data management software. After searching the files and finding the requested data, system control and the accessed data are passed back to the appropriate applications program for processing the data and taking appropriate action.

The terminal control system is a control program which handles multiple terminal operations under the control of the disc operating system. It schedules the input and output processing and enables multiple peripherals to update and retrieve information from the data files.

The job entry processor software is a telecommunications processor which uses a binary synchronous driver to interface with the remote central computer. The software package is stored in disc storage unit 16 and called in upon demand to transfer data files to and from the disc to the central computer.

The applications processes in the present system provide the interface between the previously described hardware and the systems software and define the operation of the present system. The applications processes provide the control of book processor stations 30, the checking and processing of the system data, and perform the decision making required for an operational system. Functionally, the on-line processes enable a user to self-charge books or make a hold request for books; enable a librarian to charge books in three different modes or discharge books in two different modes; enable a librarian to add or modify an entry in a Patron file, add, display or delete an entry in a Reserve file, display or delete an entry in a Hold file, add or display an entry to a Fines Paid file or display a Transaction file; enable a librarian to set current date, time, days of loan and days of hold loan, perform on-line diagnostic tests on the system and suspend or restart station operation. Off-line, a librarian can initiate transfer of all data files in the data base to a central computer and rebuild the data base with updated information from a central computer, or update the data base from cassette tape in case the daily transaction files are destroyed.

The applications processes provide a series of calls to the systems software modules and performs validity checking on data from book processor station 30 and the data files. Input/output data transfers are made by calls to the terminal control system software package, and access to the data files is provided by the data management software. For example, computer 14, after initialization, issues a call to the terminal control systsm (TCS) to read ten characters from card reader 32. Upon receipt of ten characters TCS returns control to the computer which will check the data and make a call to the data management system to access the data files. After obtaining the data and passing it to the computer, the data is checked to determine if the patron is in good standing. Then a call to TCS is made to transfer the appropriate message to display unit 34. Upon direction from computer 14, TCS will then look for an eight character message from optical scanner 38 representing the book number to pass to computer 14. The book number is then passed to the data management program to check for the number in the hold file. If the number is not found computer 14 will call TCS to generate an output bit to deactivate magnetic strip 108 in book 106.

Each book processor station 30 has three general modes of operation: "User", "Librarian-Auto" and "Librarian-Manual". The "User" mode is for self-charging books or placing a book on hold by a patron without any assistance from the librarian. Upon selection of a book 106 from the stacks, the user inserts an ID card 50 in the ID card reader 32 and places book 106 in the proper position in book tray 82. The ID card 50 is read and verified, the book bar code label 110 is automatically read, book magnetic strip 108 is deactivated, the due date is calculated, the due date slip is logged and the transaction is recorded on disc storage unit 16 and cassette tape recorder 28. Messages on the display unit 34 confirm the transaction and inform the patron when to proceed to the next transaction.

To place a book on hold, a patron enters on keyboard 36 the number of the book desired but which cannot be found in the book stacks. The computer 14 records the request, flags the librarian when the book is returned and discharged, and inhibits other patrons from charging the book. Up to five hold entries will be accepted by computer 14 for any one book.

The "Librarian-Auto" mode allows a librarian to charge books for a patron, discharge books, and display, add, delete or modify data files stored at library terminal 12. The librarian must insert a valid ID card in the ID card reader 32. The number is verified by computer 14 and the librarian enters on keyboard 36 the desired function to be performed. Messages on display 34 then tell the librarian the next action to be taken, such as place book in tray or type in ten digit user ID number. When the transaction is complete, the librarian may continue with additional transactions or depress the "CLR" key to stop the function being performed. The librarian may then enter on the keyboard the next desired function.

The "Librarian-Manual" mode enables the librarian to use book processor station 30 to manually activate or deactivate book magnetic strips 108. Since this mode is "Off-Line", activity at station 30 is not recorded by library terminal 12 and only the activate/deactivate function is active.

Referring now to FIGS. 10-22, some of the functions of the present system are described. The flow diagrams shown represent the important operational steps of the system although some minor details are not included which are obvious to one skilled in the art. For example, all off-line functions, such as transfer of data to the central computer and updating data files from the cassette tapes are not shown. Moreover, it is understood that all keyboard 36 inputs are prompted by appropriate messages on display unit 34 which are not shown in the flow charts. Furthermore, many possible error conditions are monitored by the system using a conventional approach and up to three attempts are made to accurately complete a specific function. All errors are logged on printed 26 of console 20 or are displayed on display unit 34 of station 30. Finally, a transaction may be terminated at any time by depressing the "CLR" key on keyboard 36. These details are technical matters of design choice which are not elaborated upon here because they do not involve undue experimentation or invention by one skilled in the art.

Figure 10:
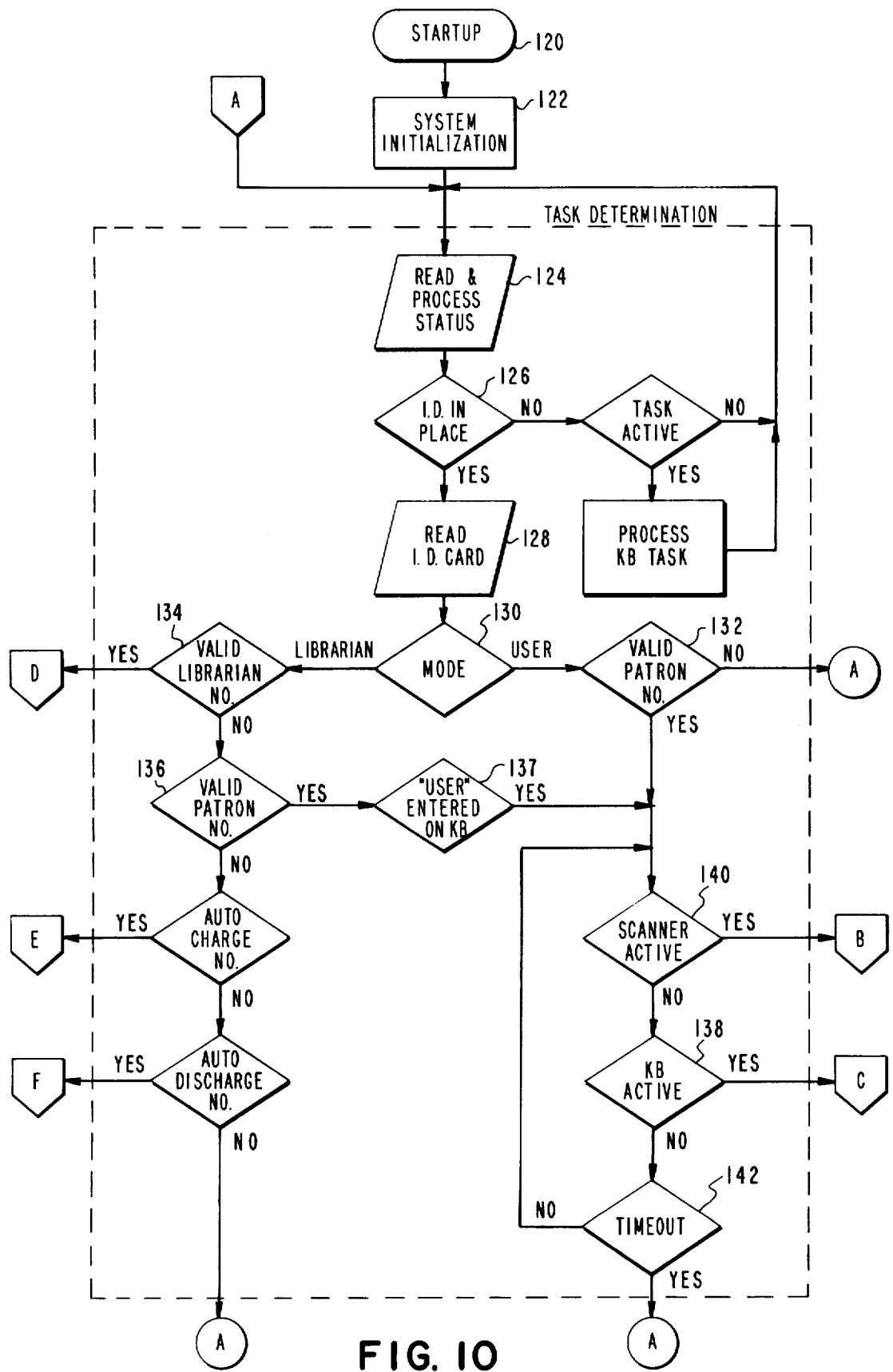

Referring now to FIG. 10, for system startup at step 120, the librarian enters the date, time, days of load, and days of hold loan on keyboard 24 after which the system is initialized at step 122 and the TCS establishes communications with all stations 30 connected to the system. Each station 30 in interrogated at step 124 for status, with the current status being logged on printer 26 of system console 20 and the appropriate message being output to the station's display 34. While a station 30 is on-line, its status is checked every two seconds and any changes are logged. The startup time is logged on disc cassette recorder 28 and printer 26, and the time is logged at the beginning of each hour. An inquiry 126 is then made to determine when an ID card is placed in the station's ID card reader 32. The library terminal 12 interrogates the station at step 128 for the ID card data and the station status. When received, the status of station 30 is checked at step 130 for "User"or "Librarian-Auto" mode. If in "User" mode, the Patron file is checked at 132 to determine if the ID number is valid, that is, whether it is in the file and is eligible to charge books. If the number is valid, the appropriate program segments are called to continue the processing. If the number is not valid, the transaction is terminated and the process returns to the beginning at "A". The next activity on this station will then start a new transaction. If station 30 is in the "Librarian-Auto" mode, the librarian file is checked at 134 to determine if the ID number represents a valid librarian. If not, the Patron file is checked at 136 to determine if the ID number represents a valid user. A valid user number results in processing similar to station 30 being in the "User" mode. A valid librarian ID number permits various keyboard entries to be processed allowing the librarian to display and modify data files and perform various book charge or discharge functions.

When a valid user ID number is processed, inquiries 138 and 140 are made looking for keyboard or scanner activity, respectively, at station 30. If scanner activity is detected, the system switches to a "User Charge" routine shown in FIG. 11. Placing a book in book tray 82 starts scanner 38 reading bar coded label 110 on book 106 as shown at step 150. The library terminal 12 interrogates for a nine digit book number (8 numerical digits and a modulo 9 check digit). If the received number satisfies the check digit at step 152, indicating a valid book number, a number of additional checks are made to determine if the book can be charged to the user. Inquiries are made at 154 and 156 to determine whether a "gate interference" or "two book" status has been detected. Further checks are made at 158 to determine that the last transaction, if any, in the transaction file for this book was a discharge, and at 160 and 162 to ascertain that the book is either not in the Hold file or that this user is the first one on the hold list for this book. The book's magnetic strip 108 is deactivated at 164 upon command by computer 14 and confirmed at 166 by checking the status of the strip. The due date for the book is then calculated at 168 based on whether the book is on reserve, on hold but not in the reserve file, or neither on reserve nor on hold. After calculation of the due date, the reserve and hold files are updated at 170. A transaction record is written on disc and cassette tape at 172 and 174 and a date due notice is logged on book processor station printer 42 at 176 to provide a user's record of the transaction. The system is then ready to start transaction with an inquiry 178 about whether the system status calls for more activity. If so, the action proceeds to "B" but if not, the process returns to "A".

If the user depresses the "Hold" key on the keyboard rather than placing a book in the book tray 82, the process goes to a "User Hold" routine at "C" in FIG. 12. Keyboard data is read at 184 and is checked at 186 for the entry of an eight digit book number to be placed on hold. When eight digits are entered, they are also determined to be one of numerals 0-9. The Hold file is interrogated at 188 to determine if the book is already on hold. If so, inquiry 190 checks whether the user is already in the Hold file or if there are more than five entries already at 192. If neither situation is present, the user number is added at 194; if five are already entered or the user is already entered, the hold request is not accepted. Should a Hold file not exist for the book number entered, a new one is created at 196 with the present user number as the first entry. A confirmation of the hold request is logged on the cassette recorder 28 and the station's printer 42. The system is then ready at 199 to start processing another hold request at "C" or to charge a book at "A".

Referring to FIG. 10, in the "User" mode a "time-out", that is a time delay of then seconds, occurs at step 142 if no activity is detected, resulting in an ID card being automatically ejected from card reader 32. In the "Librarian" mode at 134 in FIG. 10, detection of a valid librarian number causes the system to switch to a "Select Function" routine shown in FIG. 13, enabling the librarian to perform various functions by making entries on keyboard 36. To charge a book, a User ID card 50 is inserted in the card reader 32 and the processing is identical to that described above for the "User Charge" function, except the librarian must make an initial keyboard entry of "USER" at step 137 in FIG. 10. To charge a book when a librarian ID card is inserted, processing is identical to the "User Charge" routine except the librarian must first enter "CHARGE" on keyboard 36 as shown at step 204 in FIG. 13 and "gate interference" and "two book" status inquiries are not made. It is therefore not necessary to show the "Librarian Charge" process, indicated as "E", in detail.

Figure 13:
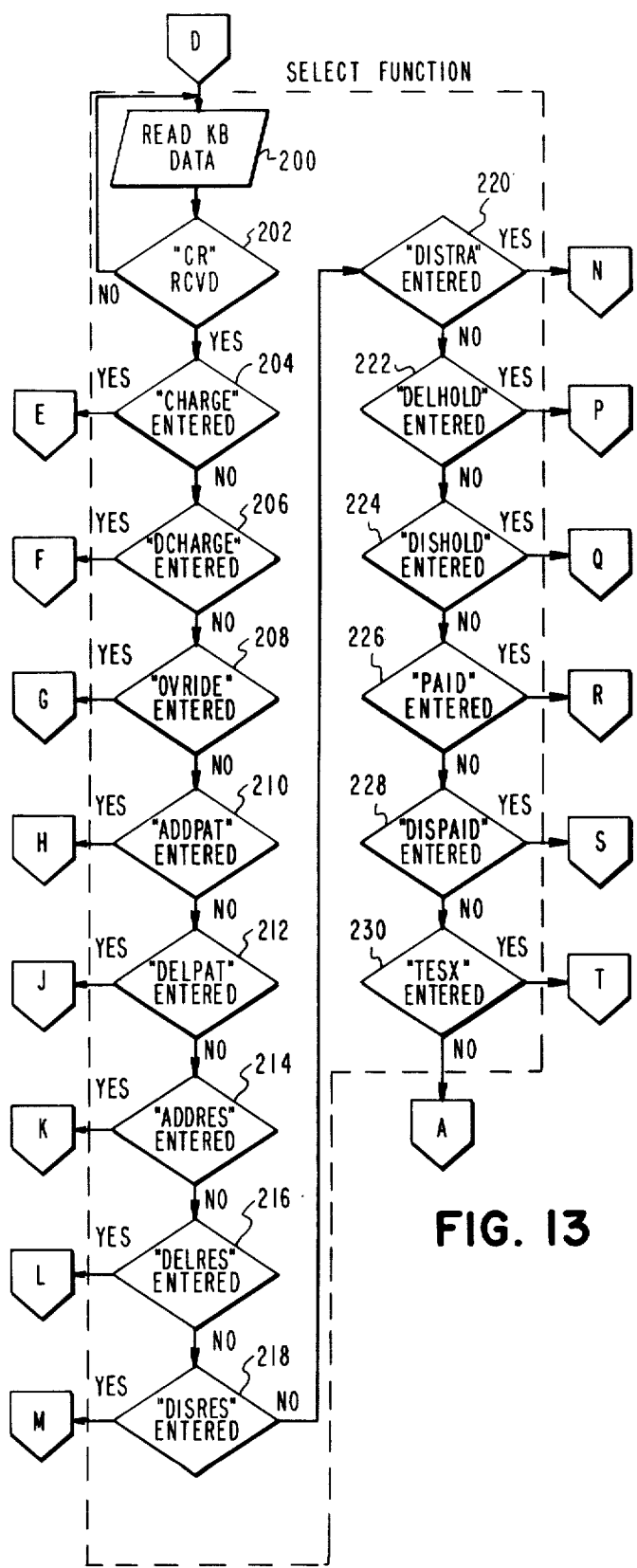
Figure 16:
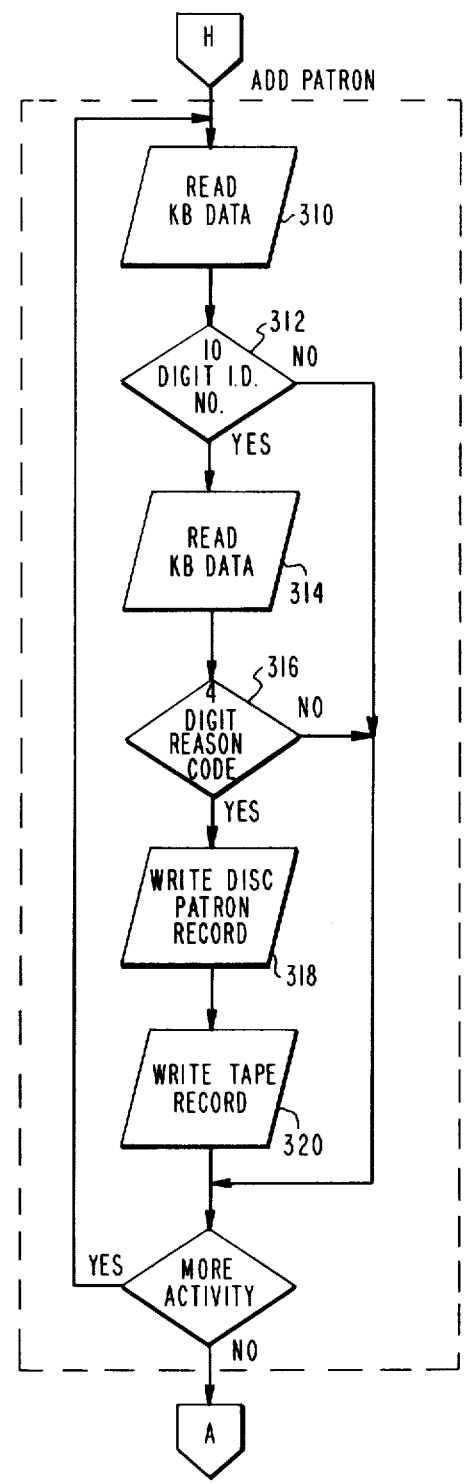
Figure 14:
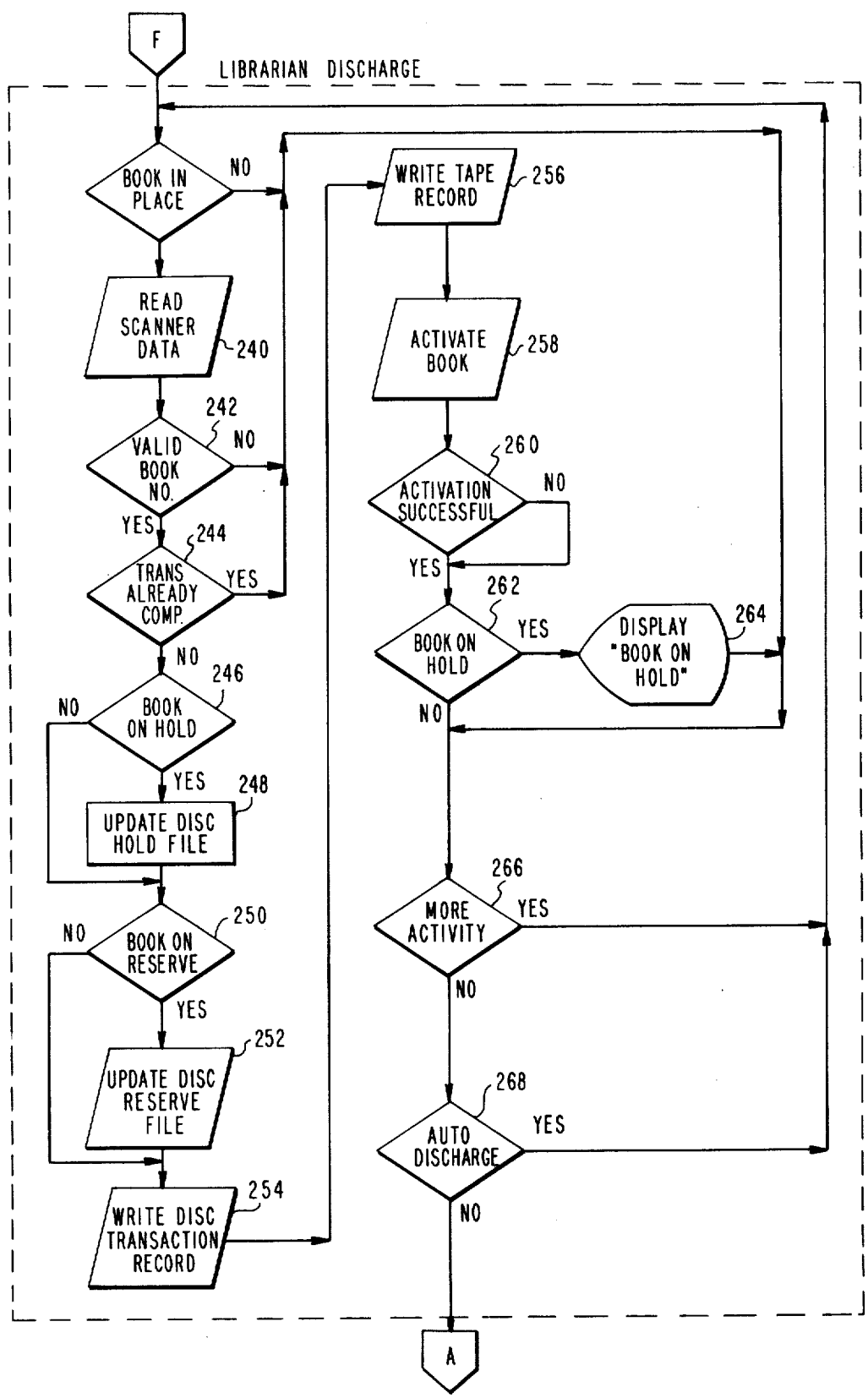
Figure 15:
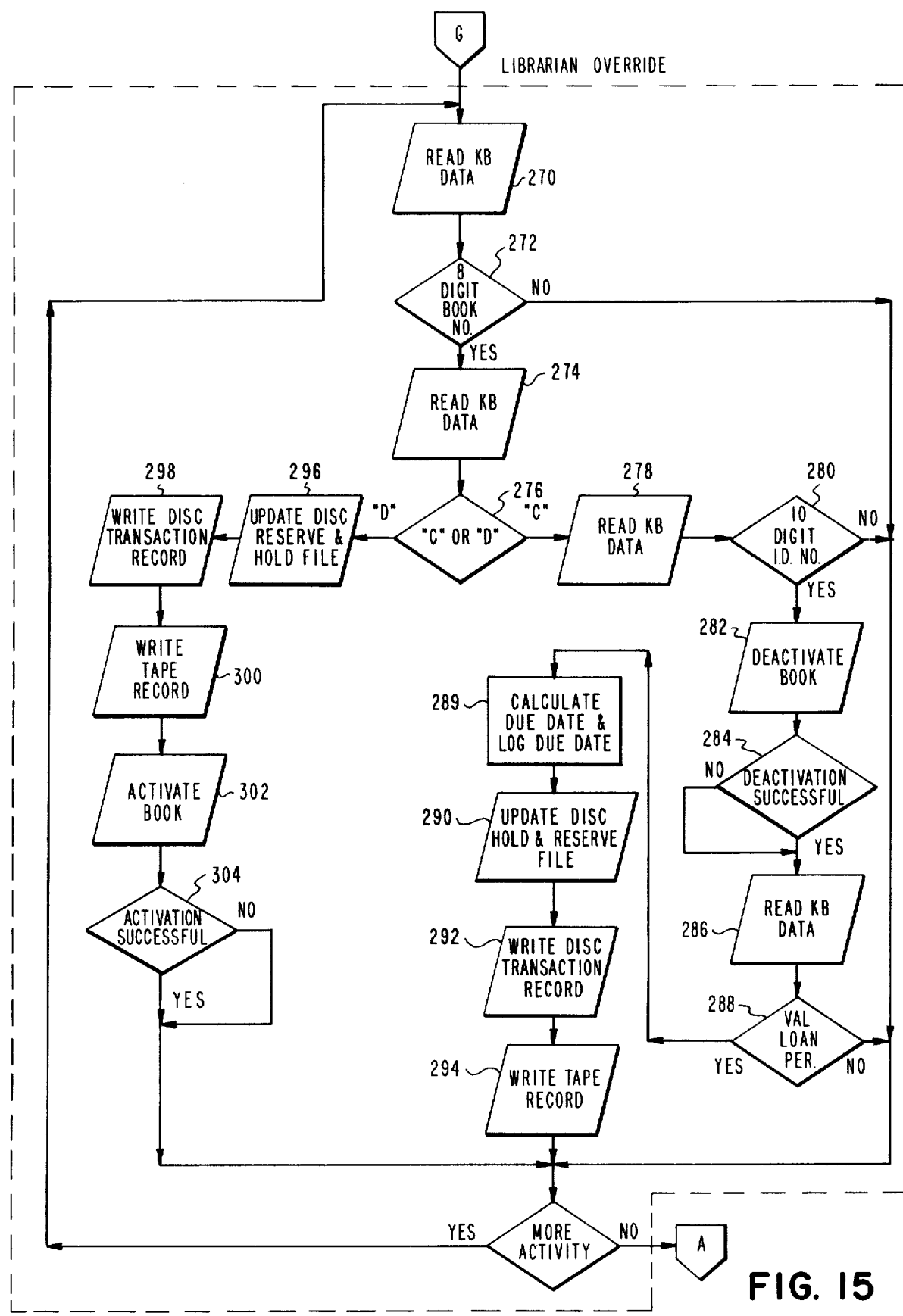
Figure 17:
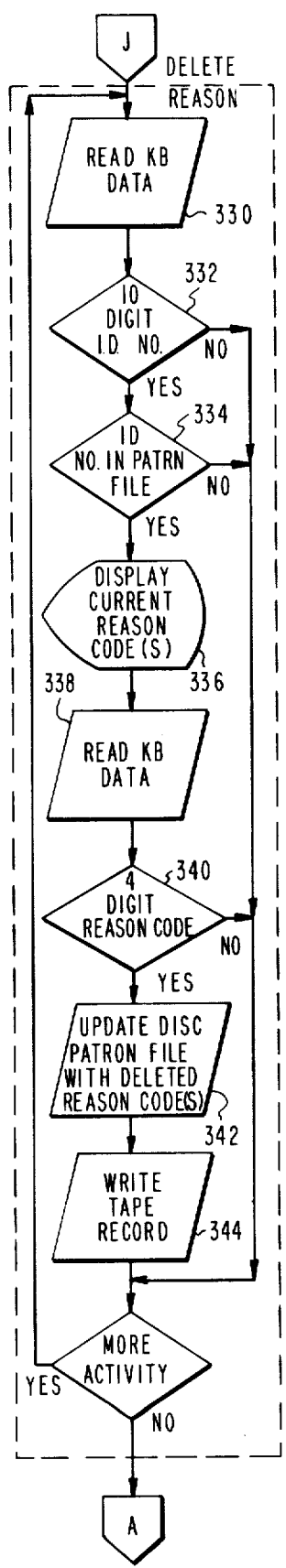
Figure 18:
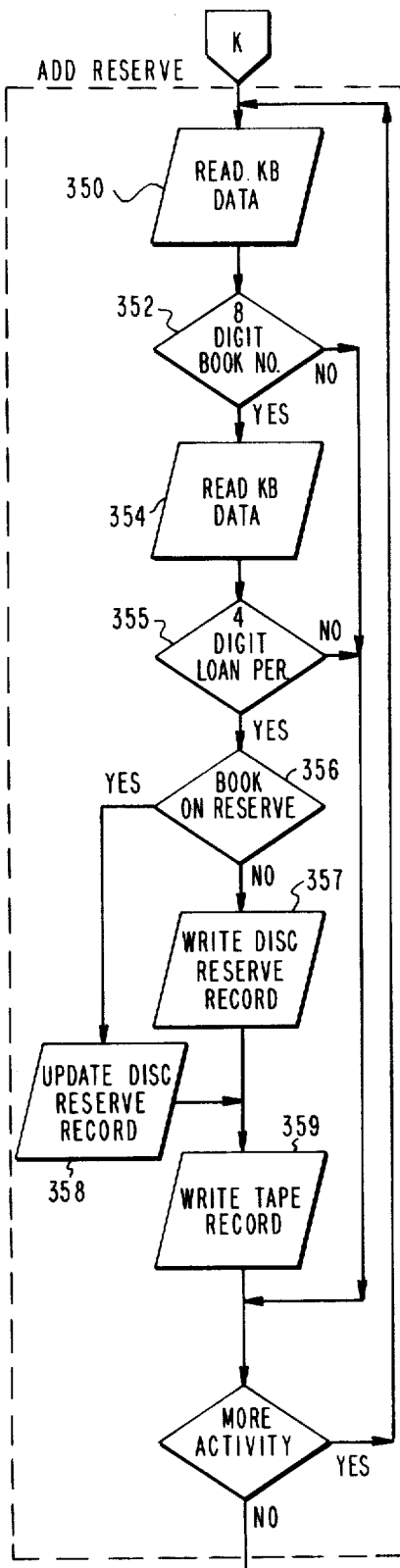
Figure 19:
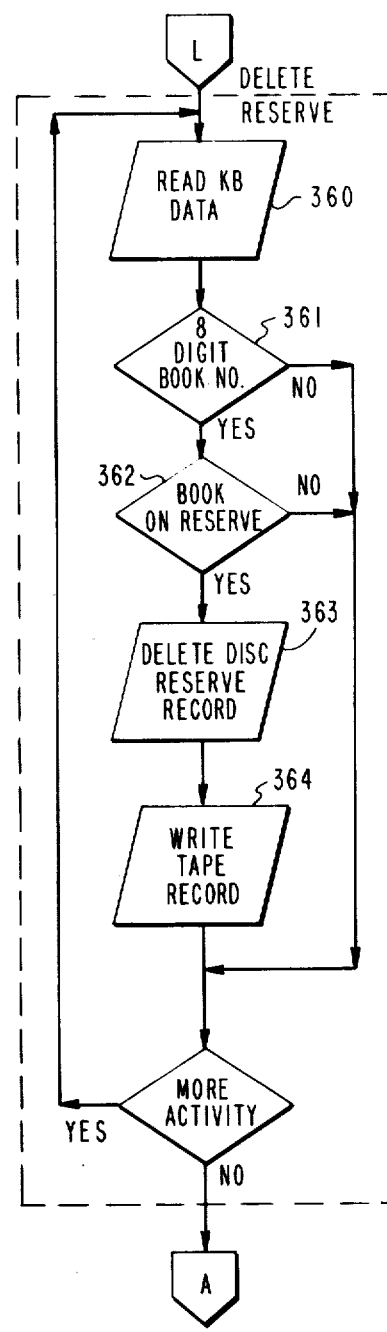

To discharge a book, a librarian enters "DCHARGE" on keyboard 36 as shown at step 206 in FIG. 13. Control is then transferred to a "Librarian Discharge" routine shown in FIG. 14. This system reads scanner data at step 240 and checks for a valid book number at 242. The Transaction data file is interrogated at 244 to determine if the last transaction (if any) was a charge. If so, the Hold file and Reserve file are updated at steps 246–252. A transaction record is generated on disc 16 and cassette recorder 28. The book strip is activated at 258 and confirmed at 260. If the book is on hold, an appropriate message is output to the station's display unit 34 at step 264 and an inquiry 266 is made about further activity. It should be understood that a similar "User Discharge" routine may be implemented by the present system to enable a patron to independently discharge a book.

The librarian can charge or discharge a book in an "Override" mode by entering "OVRIDE" on keyboard 36 as shown at step 208. System control is then transferred to a "Librarian Override" routine shown in FIG. 15. The system first looks for an eight digit book number entry on the keyboard at 270 and 272 followed by a "C" or "D" entry (charge or discharge) at 274 and 276. For a "C" entry, keyboard 36 is read at 278 and a ten digit user ID number is checked at 280. The ID number is not checked to determine if it is in the Patron file. The computer next checks for a book in place in tray 82 and then deactivates the book at 282 and 284. After deactivation, the loan period is entered on keyboard 36 and checked at step 288. The due date is calculated and logged on printer 42. The Hold and Reserve files are updated at 290 and the transaction is recorded on disc 16 and cassette 28 at 292 and 294. The system then returns to the start of the routine to perform another Override function.

If a "D" is entered indicating an override discharge, the system checks for a book in place in tray 82 and activates the book strip 108 at 302. The Hold and Reserve files are first updated, if applicable, at 296, the tranaction is recorded on disc 16 and cassette 28 at 298 and the book strip is activated at 300 nd 302. The system is then ready to perform another Override function.

The remaining "On-line" functions the librarian can select, as shown in FIG. 13, are associated with displaying, adding or deleting data in the data base thus providing the librarian with current information required for efficient operation of the system. To add a patron to the Patron file, the librarian enters "ADDPAT" on keyboard 36 as shown at 212. System control is transferred to an "Add Patron" routine shown in FIG. 16. Keyboard 36 is read at 310 and checked for a ten digit number entry on keyboard 36 at 312. The keyboard is checked at 314 and 316 for a patron reason code up to four digits long. Examples of valid reason codes are "Stolen Card", "Owes Fines", "Overdue Books", and "20 Books or More Currently Charged". If a patron is added without any comment or restriction, the reason code is "0". Upon detection of valid keyboard entries, the number and reason codes are added to the Patron file at 318, a cassette record is written at 320 and a confirmation message is output to the station's display 34. The system is then ready for entry of another ten digit user number to the Patron file.

The Librarian can delete reason codes for a patron by entering "DELPAT" at step 212 in FIG. 13. Control is then switched to the "Delete Reason" routine in FIG. 17. The system looks for a ten digit user ID keyboard entry at 330 and 332, searches the Patron file for the number at 334 and displays the current reason coes at 336. If the number is not in the file, a message so indicates. A keyboard entry is made at 338 indicating the reason codes to be deleted. Upon receipt, the Patron file is updated at 342, a cassette record is written at 344 and a confirming message is displayed.

A book can be added or deleted from the Reserve file by entering "ADDRES" or "DELRES", respectively, on keyboard 36, as shown at 214 and 216 in FIG. 13. Control is transferred to the "Add Reserve" or "Delete Reserve" routines of FIGS. 18 and 19, respectively. The system initially looks for an eight digit keyboard entry at 350 and 360. For the "Add Reserve" function, the load period is entered on keyboard 36 at 354 and checked at 355. The Reserve file is then interrogated at 356 to determine if the book in question is already in the file. If not, it is added at 357; if so, then the new load period is entered at 358. The entry is recorded on cassette recorder 28 at 359 and confirmed on the display unit 34. For the "Delete Reserve" routine, a check is first made to determine if the book is on reserve at step 362. If so, the eight digit number is deleted from the file at 363 and the confirmation is displayed. Finally, the transaction is recorded on cassette recorder 28 at step 364.

Figure 20:
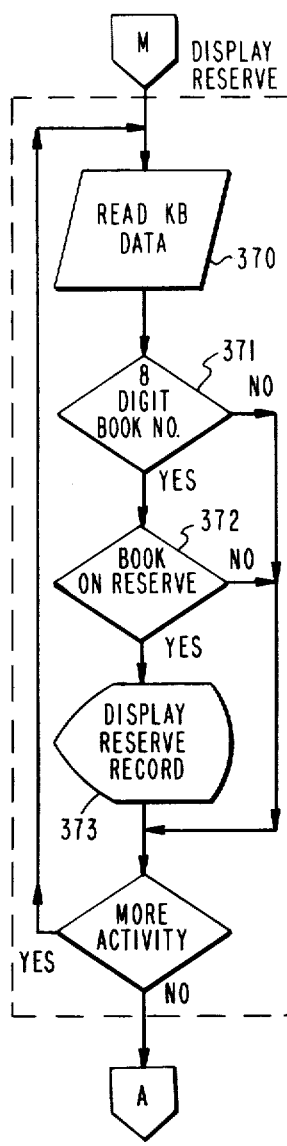
Figure 21:
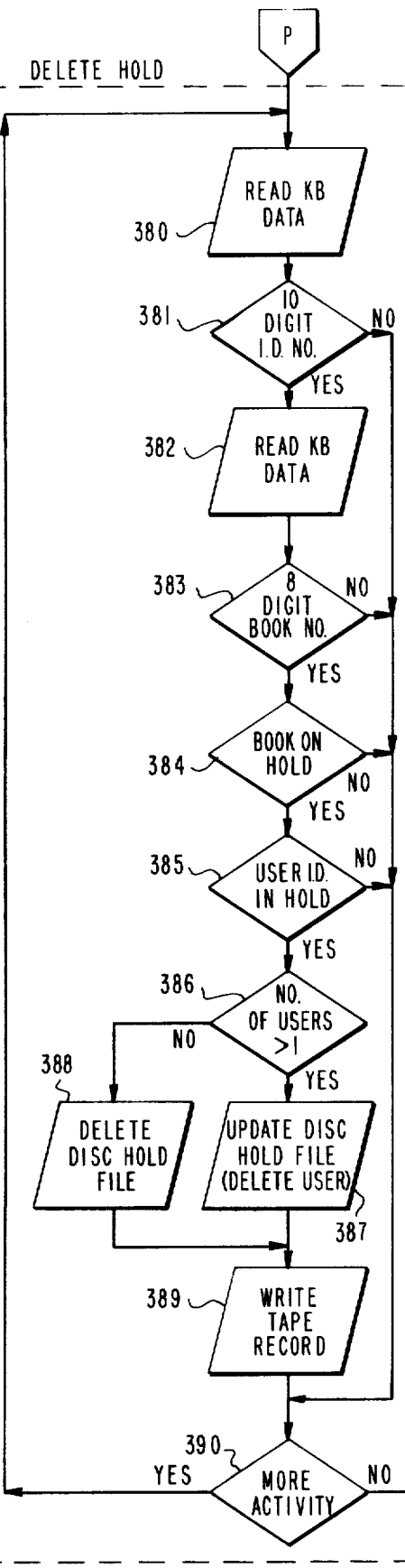
Figure 22:
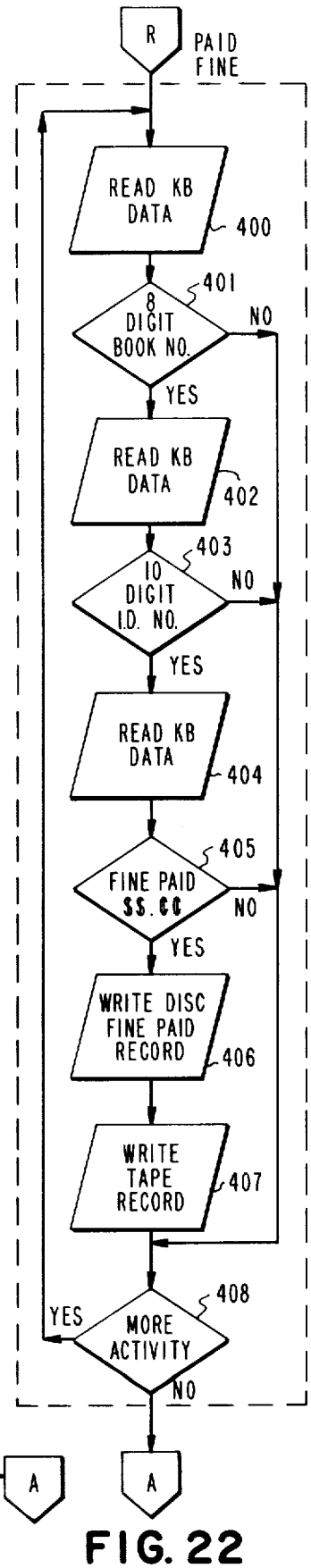

A "Display Reserve" routine shown in FIG. 20, is initiated by entering "DISRES" at 218 in the "Selection Function" routine. Upon entry of an eight digit book number at 370, the system searches the Reserve file at 372 and, if the number is in the file, formats the data for display at 373. The displayed information includes the load period, current user ID number and due date, if currently charged, or date discharged, if currently discharged. Similar routines are used to display the transaction Hold and Fine Paid files which are called at steps 220, 224 and 228, respectively, of FIG. 13, and the separate flow charts need not be shown herein.

Another function performed by the librarian is to delete an entry in the Hold file. This action is initiated by entering "DELHOLD" on keyboard 36 at step 222 in FIG. 13, transferring control to the "Delete Hold" routine of FIG. 21. The system requests the entry of the ten digit ID number of the user which is to be deleted at 380 followed by the corresponding eight digit book number at 382. The system then checks the hold file at 384 for the book number. If the book number is found then the associated user ID numbers in the file are compared at 385 with the keyboard entry. If a match is found, a record is written on cassette recorder 28 at 389 and the user ID number is deleted at 387 from the file for that book. If there is only one ID number in the file for that book, the user number and book number are both deleted. Confirmation is displayed on station display unit 34.

To add an input to the Paid Fine file, the librarian enters "PAID" on keyboard 36 at step 226 of FIG. 13. This calls the "Paid Fine" routine shown in FIG. 22. The system checks for keybaord entries giving an eight digit book number at 401, a ten digit user ID number at 403, and the amount of fine at 405. When the data is received in the proper format, a record is written on disc storage 16 in the Paid Fine file at 406 and on cassette recorder 28 at 407. A confirmation message is output to the station display unti 34.

Once a routine is started, station 30 is continually monitored for appropriate activity, such as keyboard or scanner data, depending on the specific routine in process. If no activity is detected within a predetermined time, the transaction is automatically terminated by a "timeout" step such as 142 in FIG. 10 and the system returns to the Task Determination routine. The "timeout" period varies with the function being performed but generally is approximately ten seconds in the "User" mode and fifty seconds in the "Librarian" mode. In the "User" mode, the ID card is automatically ejected when a timeout occurs. Depressing the "CLR" key on keyboard 36 will terminate the transaction immediately and return control to the Task Determination routine.

The system also continually monitors station 30 to assure that proper response are being received and that station 30 is operating as expected. When possible problems are detected, they are logged on system console 20, facilitating quick diagnosis. In most cases up to three attempts are made to perform a designated function before a failure is logged. When the function is performed as expected a "clear" message is logged. Certain messages also provide insight to difficulties the user may be experiencing in the use of station 30. For example, the message "STA 01 STATUS INT TO" indicates station number 1 is not responding to a status interrogation from the library terminal 12. This could indicate that the station power is off, the station is not connected or a hardware failure has occurred. When the problem is cleared, a message "STA 01 STATUS INT TO C" is logged. User difficulties may be indicated if the message "STA 02 GATE INTERFERENCE" is logged followed by "STA 02 GATE INTERFERENCE C". This may indicate the user is not understanding the displayed message that his hands must be removed from the book tray area before the "User Charge transaction is allowed to continue.

An "On-line" diagnostic routine can be called by entering "TESTX" on keyboard 36, as shown at step 230 of FIG. 13. This routine allows confirmation of all operations of book processor station 30 while the remaining stations remain "On-line" to perform library transactions. The diagnostic routine simulates normal operation using many of the same processes as used in performing transactions except access is not permitted to the data base files by the station under test.

Applications routines may be utilized "Off-line" to perform additional functions for the system. For example, a remote job entry process, which includes the conventional remote job entry systems software, transfers data files to and from the central computer and a data file recovery process searches the cassette tape and updates the disc data files from the cassette tape records.

While one embodiment of the invention has been described in detail herein and shown in the acompanying drawings, it is understood that the present invention is not limited to the described embodiment but is capable of numerous rearrangements, modifications and substitutions of parts and elements without departing from the spirit of the invention.

What is claimed is:

1. An automated library circulation and security control system for enabling only authorized users of library materials to independently charge items of said library materials to their accounts and to independently remove the charged items from the library, each item of said materials having identifying indicia thereon and a status-indicating element attached thereto alterable between multiple states to represent the circulation status of said item, comprising:

card reading means actuable by said user including means for reading user indicia on a card presented by an authorized user, and means for generating a first signal representative of said user indicia;

code reading means actuable by said user including a housing having a support for maintaining said one library item stationary, scanning means mounted in said housing near said support for reading said indicia on said item of library materials identifying said item, and means for generating a second signal representative of said item;

data processing means in electrical communication with said card reading means and said code reading means, including a memory for storing electronic records having data files representative of said authorized users and of the library items authorized to be charged by said authorized users, including means for comparing said first and second signals with said data files, means for generating an enabling signal in response to said first and second signals corresponding to an authorized user and authorized item in said data files and means for storing said first and second signals in said stored records to charge said item to said user;

security means adjacent said support and responsive to said enabling signal from said data processing means for changing the state of said status-indicating element attached to said library item as said item rests on said support to change the circulation status of said item;

detection means near an exit of said library for sensing the status-indicating element of said library item as it is removed from the library to determine the circulation status of said item; and alarm means in electrical communication with said detection means for generating a signal in response to a sensed circulation status for which removal of said item is not authorized.

2. The system of claim 1 wherein said card reading means comprises an optical reader having a slot for insertion of said card and optical sensors adjacent said slot to read said card indicia.

3. The system of claim 1 wherein said scanning means comprises optical scanning means mounted in said housing above said support to read said visual indicia on said library item.

4. The system of claim 1 wherein said data processing means comprises a digital electronic computer having first memory means for storing user data representative of said authorized users, second memory means for storing item data representative of said authorized items, processing means for comparing said first signal to said user data and for comparing said second signal to said item data, and control means for generating said enabling signal in response to said first signal corresponding to said user data and said second signal corresponding to said item data.

5. The system of claim 1 wherein said status-indicating element is a magnetic element attached to said library item, and wherein said security means comprises electromagnetic means actuable by said data processing means for magnetizing and demagnetizing said magnetic element.

6. The system of claim 5 wherein said detection means comprises means for generating an electromagnetic field in an exit path from the library to sense the status of said magnetic element attached to said item as it is removed from the library.

7. The system of claim 1 and further characterized by keyboard means in electronic communication with said data processing means for modifying the data records stored by said data processing means representative of authorized users and authorized items to be charged by the authorized users.

8. A book processor station for use in a library circulation and security control system utilizing a computer and an actuable alarm unit for detecting the circulation status of library books, said system enabling an authorized user to independently conduct transactions without librarian assistance and to independently modify the circulation status of library books, each book having indicia to identify the book and multiple-state means representative of the circulation status of the book having at least one state which will actuate said actuable alarm unit, comprising:
 housing means including means for supporting a book in a stationary position and means for signaling the computer that the book is in position for processing;
 card reader means mounted in said housing means actuable by said user, including means for accepting a user card having indicia identifying said user and means for generating a first signal representative of said card indicia;
 code reader means mounted in said housing means adjacent said supporting means, including means for sensing said identifying indicia on the stationary book and means for generating a second signal representative of said book indicia;
 communication means, including means for transmitting said first and second signals to said computer for comparison with data signals stored in said computer, and means for receiving an enabling signal from said computer generated in response to said comparison; and
 means mounted in said housing means adjacent said supporting means and actuable by said enabling signal for changing the state of said multiple-state means as the book is placed adjacent thereto to a state which will not actuate said alarm unit for detecting circulation status of the book.

9. The book processor station of claim 8 wherein said housing means comprises an enclosure for supporting said book, sensing means associated with said enclosure for detecting the presence of an item other than said book in said enclosure, and means for generating and transmitting to said computer a signal responsive to said sensing means.

10. The book processor station of claim 8 wherein said code reader comprises an optical scanner pivotally supported in said housing means in a fixed position above said supporting means to scan said book indicia.

11. The station of claim 8 wherein said card reader comprises an optical reader having a slot for inserting said card, optical sensing means for reading said indicia on said card and means for generating said first signal representative of said card indicia.

12. The station of claim 8 and further comprising keyboard entry means for generating data signals to be sent by said transmitting means to said computer.

13. The book processor station of claim 8 and further comprising display means for receiving data signals from said computer by said receiving means and for visually displaying information for said user representative of said data signals.

14. The book processing station of claim 8 and further comprising printing means for receiving data signals from said computer by said receiving means and for visually printing information for said user representative of said data signals.

15. The book processing station of claim 8 wherein said multiple-state means comprises a magnetic strip attached to the book and wherein said means for changing the state of said multiple-state means comprises actuable electromagnetic means adjacent said supporting means for magnetizing and demagnetizing said magnetic strip attached to the book.

16. The book processing station of claim 8 wherein said station is remote from said computer and wherein said transmitting and receiving means comprise electrical cables connecting said station and said computer.

17. In an automated real-time library system having a computer for controlling the circulation of a plurality of library items and for limiting access to said library items to only predetermined authorized users and for only predetermined authorized items by comparing data signals representative of said items and users to data files stored in memory of said computer and by transmitting a control signal in response to said items and users being authorized, each item having a status-indicating element alterable between multiple states to represent the circulation status of said item, a processor for changing the state of said element to alter the circulation status of said library item, comprising:
 means for generating a first data signal representative of a library item and means for generating a second data signal representative of a library user for transmission to said computer;
 support means in said processor including a receptacle having a first portion in which said authorized library item is supported in a stationary position and a second portion in which said library item tends to move toward said first portion of said receptacle;
 means in said receptacle for securing only one of said library items in said second portion of said receptacle;
 means associated with said support means for altering the status-indicating element of said library item in said second portion in response to said control signal generated by said computer after receiving said first and second data signals;
 first sensing means for said receptacle for sensing the presence of an object in the first portion of said receptacle and thereby generating a first alarm signal;

second sensing means about the periphery of said receptacle for sensing an object across said periphery and thereby generating a second alarm signal; and means in communication with said first and second sensing means for generating a disable signal to disable said altering means in response to either said first alarm signal or said second alarm signal.

18. The processor of claim 17 wherein said support means comprises a tray having a bottom surface inclined at an angle to the horizontal for said library item to slide by gravity toward the lower part of said tray, and wherein said altering means is positioned adjacent the upper part of said tray.

19. The processor of claim 18 wherein said securing means comprises means on the bottom surface of said tray in said upper part for holding said library item stationary in said upper part of the tray.

20. The processor of claim 17 wherein said first sensing means in said receptacle comprises a photocell in communication with a light source across the lower part of the tray.

21. The processor of claim 17 wherein said second sensing means comprises a plurality of photocell units around the periphery of said receptacle in communication with light sources in said support means above the periphery of the receptacle.

22. The processor of claim 17 wherein said status-indicating element comprises a magnetic strip on said library item and wherein said altering means comprises electromagnetic coil means for magnetizing and demagnetizing said magnetic strip.

23. An automated system for recording and controlling inventory transactions by enabling patrons authorized for access to inventory materials to independently charge items of said materials to their accounts and to independently remove the charged items from the inventory, each item of said materials having thereon inventory indicia and a status-indicating element alterable between multiple state to represent a control status of said item detectible by a sensing device, comprising:

means actuable by said patron for identifying said patron, including means for interpreting patron indicia presented by said patron, and means for generating a first signal representative of said patron indicia;

code reading means responsive to said identifying means, including a housing having a support for maintaining said one inventory item stationary, scanning means mounted in said housing near said support for reading said inventory indicia on said item of inventory materials identifying said item, and means for generating a second signal representative of said item;

data processing means in communication with said identification means and said code reading means, including a memory for storing electronic records having data files representative of said authorized patrons and of the inventory items authorized to be charged by said authorized patrons, including means for comparing said first and second signals with said data files, means for generating an enabling signal in response to said first and second signals corresponding to an authorized patron and an authorized item, respectively, in said data files and means for storing said first and second signals in said stored records to charge said item to said patron; and security means adjacent said support responsive to said enabling signal from said data processing means for changing the state of said statusindicating element on said inventory item as said item rests on said support to change the control status of said item so that said item may be removed from inventory without detection by said sensing device.

24. The system of claim 23 wherein said identifying means comprises card reader means for reading patron indicia on a card presented by the patron to the card reader.

25. The system of claim 23 wherein said code reading comprises an optical scanning means for reading said inventory indicia.

26. The system of claim 23 wherein said status-indicating element comprises a magnetic element on each item having magnetized and demagnetized states and wherein said security means comprises electromagnetic means for changing said magnetic element between said magnetized and demagnetized states.

27. The system of claim 26 wherein said sensing device comprises means for generating a magnetic field in an exit path from said inventory to sense the state of said magnetic element of said item as it is removed from inventory.

28. A method of using a book processor station in a library circulation and security control system utilizing a computer and an actuable alarm unit for detecting the circulation status of library books, said system enabling an authorized user to independently conduct transactions without librarian assistance and to independently modify the circulation status of library books each book having indicia to identify the book and multiple-state means representative of the circulation status of the book having at least one state which will actuate said actuable alarm, comprising:

supporting a book in a stationary position on a housing and generating a signal to the computer that the book is in position for processing;

actuating a card reader mounted in said housing to accept a user card having indicia identifying said user and to generate a first signal representative of said card indicia;

actuating a code reader mounted in said housing to sense said identifying indicia on the stationary book and means for generating a second signal representative of said book indicia;

transmitting said first and second signals to said computer for comparison with data signals stored in said computer, and receiving an enabling signal from said computer generated in response to said comparison; and changing the state of said multiple-state means as the book is supported on the housing to a state which will not actuate said alarm unit for detecting circulation status of the book.

29. A method of using a processor in an automated real-time library system having a computer for controlling the circulation of a plurality of library items and for limiting access to said library items to only predetermined authorized users and for only predetermined authorized items, each item having a status-indicating element alterable between multiple states to represent the circulation status of said item, said processor being adapted to change the state of said element to alter the circulation status of said library item, comprising:

generating a first data signal identifying an authorized item and a second data signal identifying an authorized user of said item for transmission to said computer;

supporting said library item in said processor in a receptacle having a first portion in which said authorized library item is supported in a stationary position and a second portion in which said library item tends to move toward said first portion of said receptacle;

securing only one of said library items in said second portion of said receptacle;

altering the status-indicating element of said library item in said second portion in response to a control signal generated by said computer after receiving said first and second data signals;

sensing the presence of an object in the first portion of said receptacle and thereby generating a first alarm signal;

sensing an object across the periphery of said receptacle and thereby generating a second alarm signal; and generating a disable signal to disable said altering means in response to either said first alarm signal or said second alarm signal.

30. A method of using an automated system having a computer for recording and controlling inventory transactions to enable patrons authorized for access to inventory materials to independently charge items of said materials to their accounts and to independently remove the charged items from the inventory, each item of said materials having thereon inventory indicia and a status-indicating element alterable between multiple states to represent the control status of said item, comprising:

identifying said patron, including interpreting patron indicia presented by said patron, and generating a first data signal representative of said patron indicia;

positioning said item stationary on a support having a scanning device capable of reading said inventory indicia;

reading said inventory indicia on said item of inventory materials identifying said item using said scanning device in said support, and generating a second data signal representative of said item;

comparing said first and second data signals with data files stored in memory of said computer having data representative of said authorized patrons and of the inventory items authorized to be charged by said authorized patrons;

generating an enabling signal in response to said first and second data signals corresponding to an authorized patron and an authorized item, respectively, in said data files;

storing said first and second data signals in said stored records to charge said item to said patron;

changing the state of said status-indicating element on said inventory item with said item positioned on said support in response to said enabling signal to change the control status of said item;

sensing the status-indicating element of said item of inventory materials as it is removed from inventory to determine the control status of said item; and generating an alarm signal in response to a sensed control status for which removal of said item is not authorized.

* * * * *